United States Patent [19]

Ikegame

[11] Patent Number: 5,761,183

[45] Date of Patent: Jun. 2, 1998

[54] OPTICAL PICKUP

[75] Inventor: Tetsuo Ikegame, Tokyo, Japan

[73] Assignee: Olympus, Optical Co., Ltd., Tokyo, Japan

[21] Appl. No.: 693,488

[22] Filed: Aug. 2, 1996

Related U.S. Application Data

[63] Continuation of Ser. No. 167,649, Dec. 14, 1993, abandoned.

[30] Foreign Application Priority Data

| Dec. 24, 1992 | [JP] | Japan | 4-344565 |
| Dec. 24, 1992 | [JP] | Japan | 4-344672 |
| Jan. 12, 1993 | [JP] | Japan | 5-003388 |

[51] Int. Cl.$^6$ .......................... G11B 17/00; G11B 21/02; G11B 21/16
[52] U.S. Cl. .......................... 369/220; 369/244; 369/249
[58] Field of Search .......................... 369/215, 219, 369/220, 244, 247

[56] References Cited

U.S. PATENT DOCUMENTS

| 5,105,419 | 4/1992 | Ogura et al. | 369/219 |
| 5,303,223 | 4/1994 | Sakaguchi et al. | 369/215 |
| 5,305,299 | 4/1994 | Maeda | 369/215 |
| 5,375,115 | 12/1994 | Shimegi et al. | 369/244 |

FOREIGN PATENT DOCUMENTS

| 61-224171 | 10/1986 | Japan | 369/292 |
| 63-117384 | 5/1988 | Japan | . |
| 1222646 | 9/1989 | Japan | 310/12 |
| 3-212823 | 9/1991 | Japan | 369/215 |
| 4186533 | 7/1992 | Japan | 369/269 |
| 4195730 | 7/1992 | Japan | 360/114 |

*Primary Examiner*—Stuart S. Levy
*Assistant Examiner*—William J. Klimowicz
*Attorney, Agent, or Firm*—Laff, Whitesel, Conte & Saret, Ltd.

[57] ABSTRACT

An optical pickup records data on, and reproduces data from, an optical disk contained in a cartridge having a window. The pickup comprises a movable assembly including an objective lens, a support mechanism supporting the movable assembly to allow the movable assembly to move in a radial direction of the optical disk, and drive mechanism for driving the movable assembly in the radial direction of the optical disk. One part of the movable assembly, and one part of the support mechanism and/or the drive mechanism are arranged within the window of the cartridge.

10 Claims, 17 Drawing Sheets

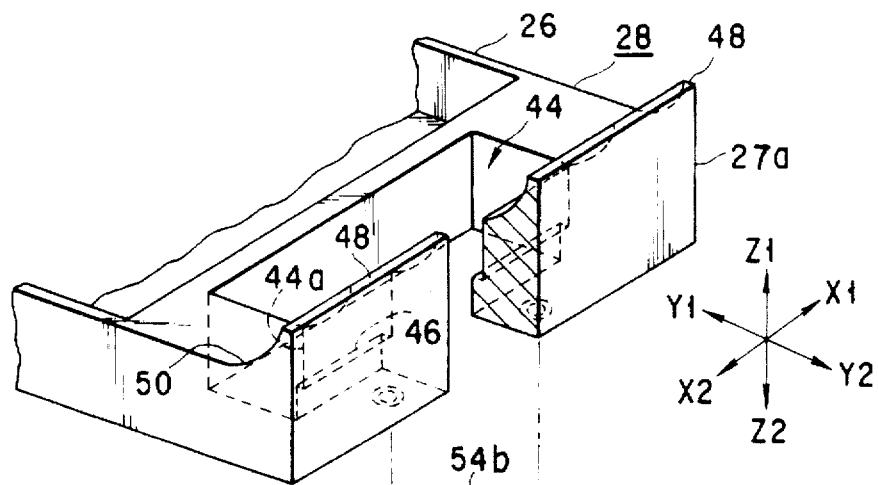
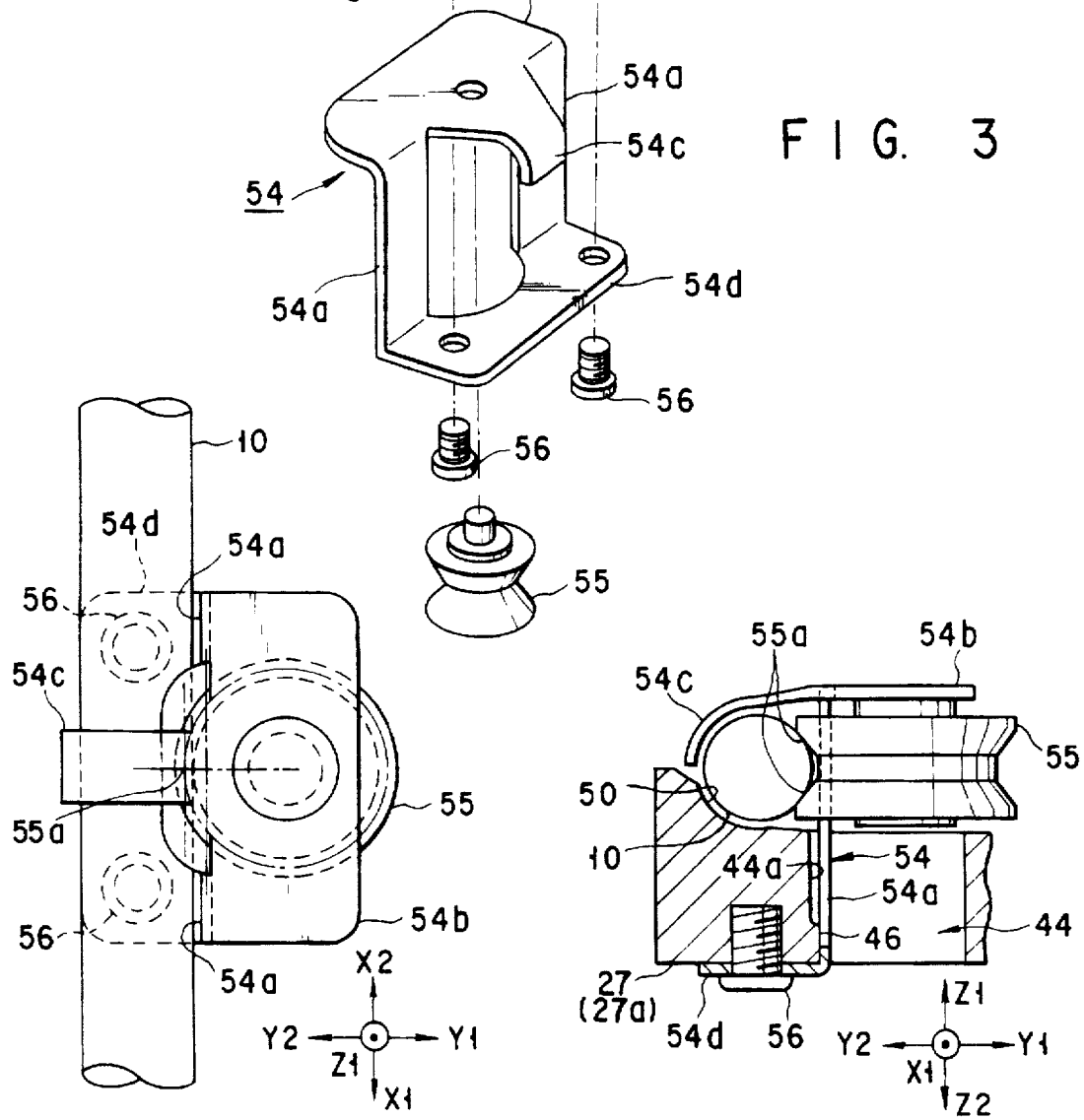
FIG. 3
FIG. 4A
FIG. 4B

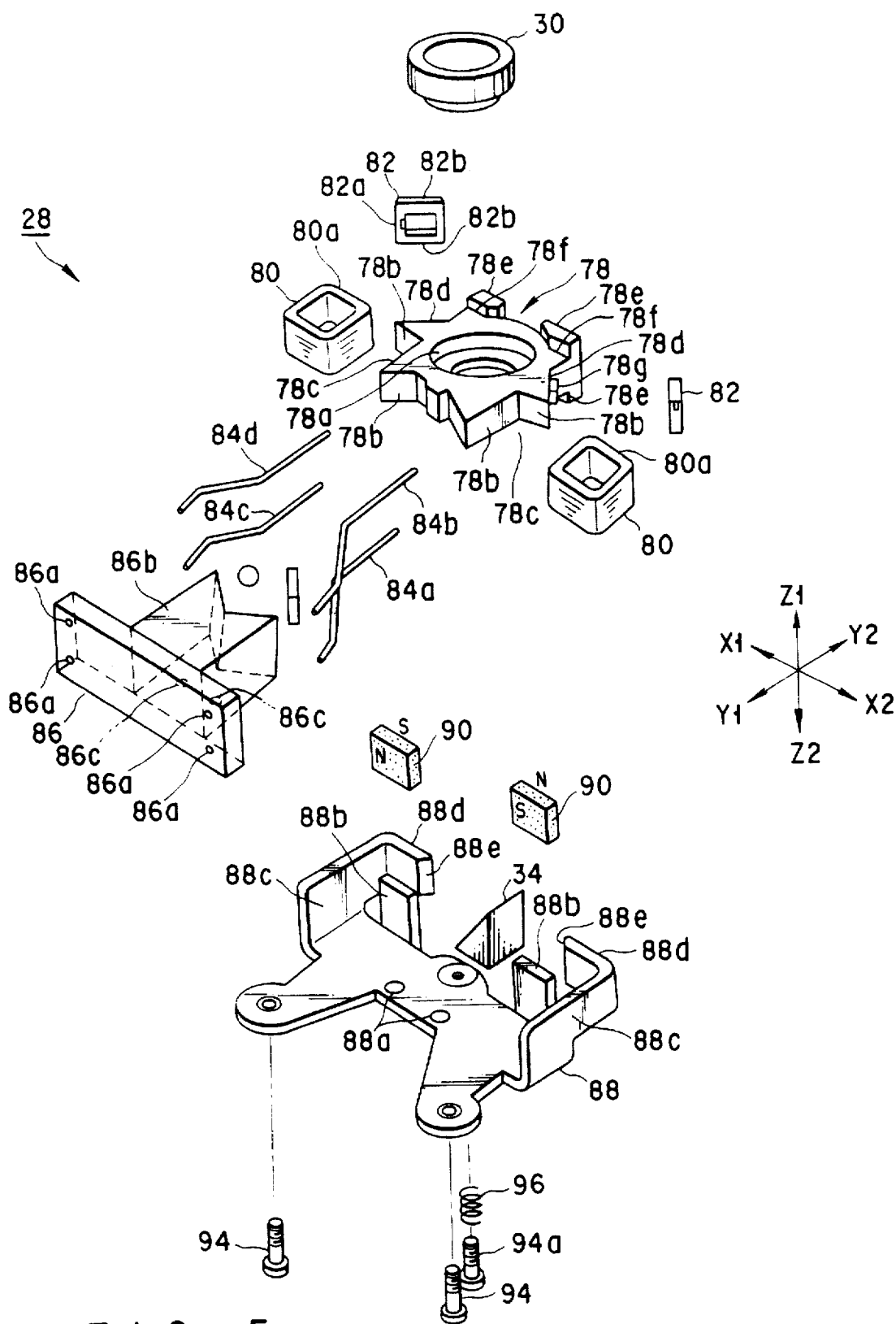
F I G. 5

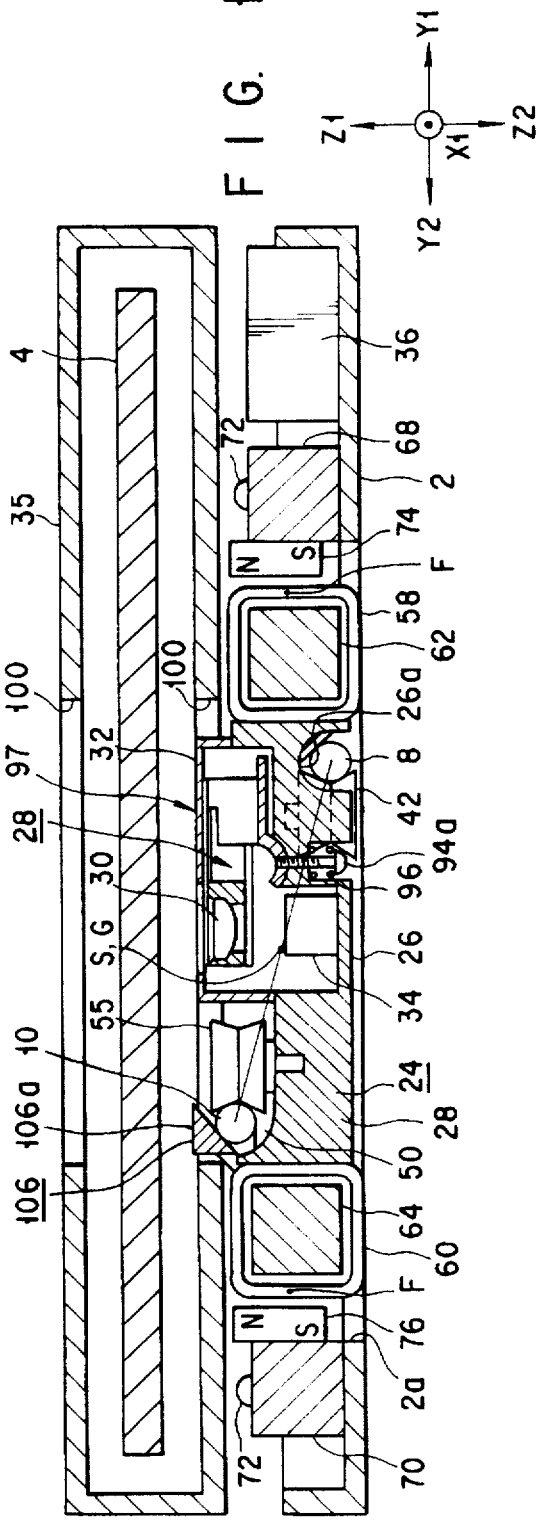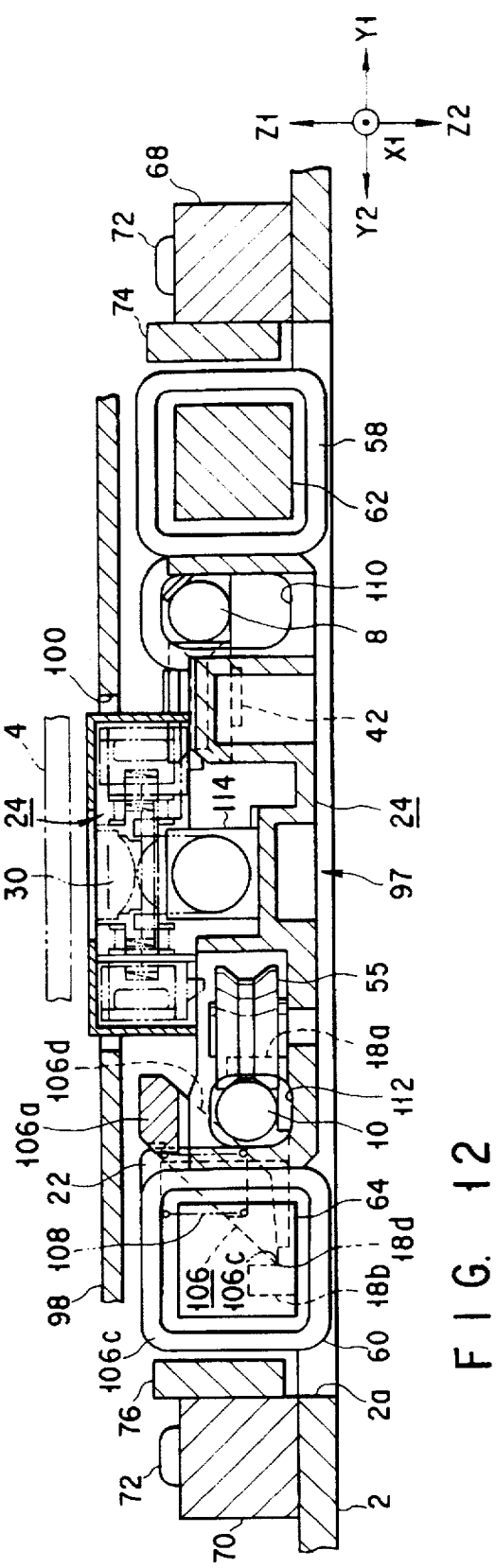

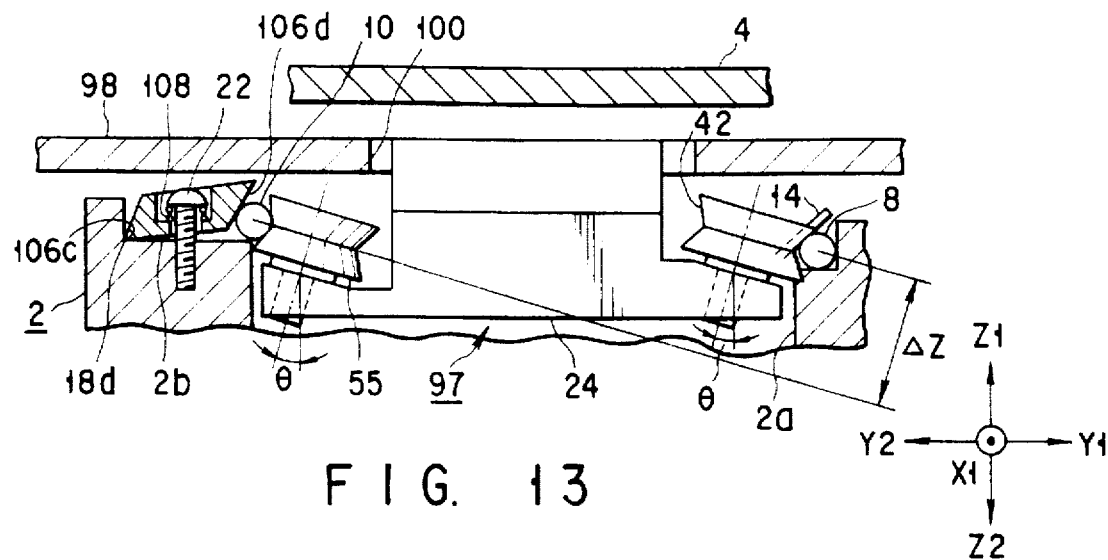
F I G. 13
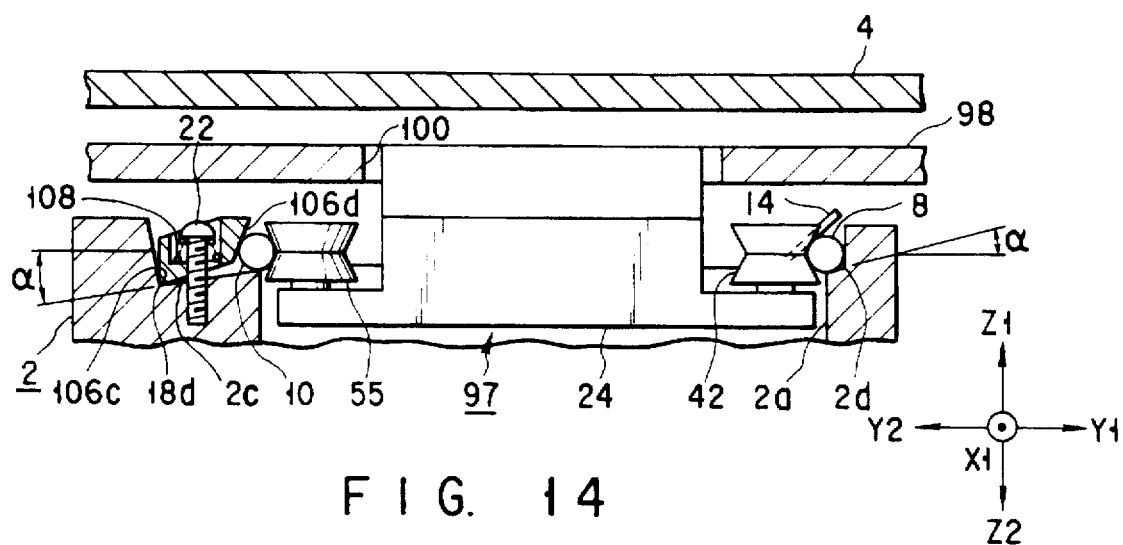
F I G. 14
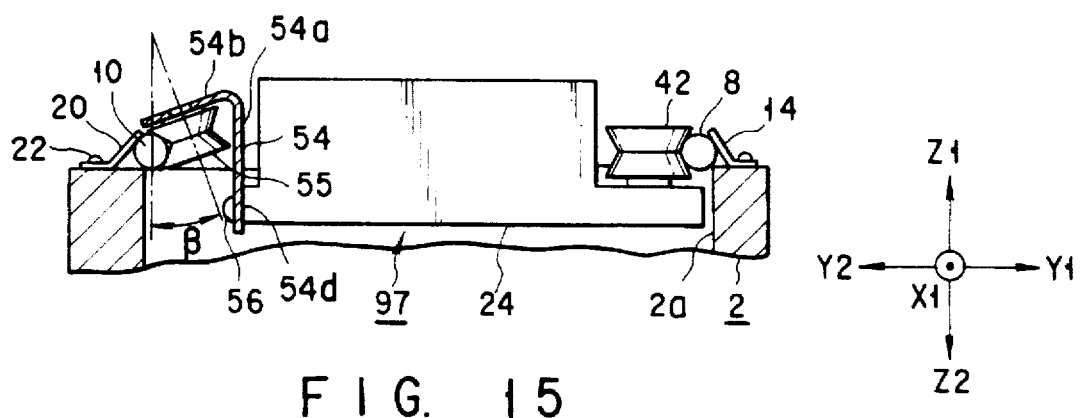
F I G. 15

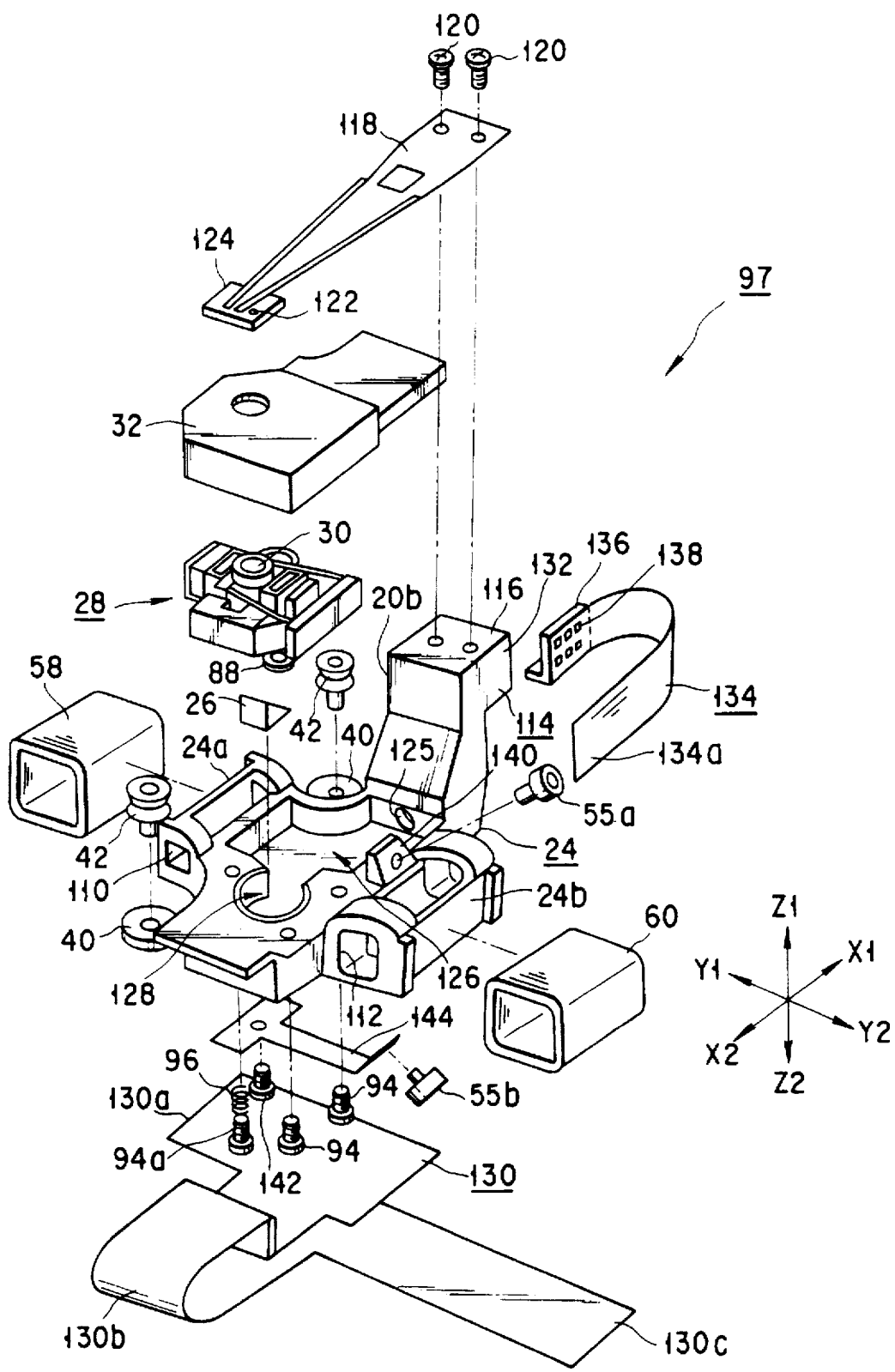
F I G. 17

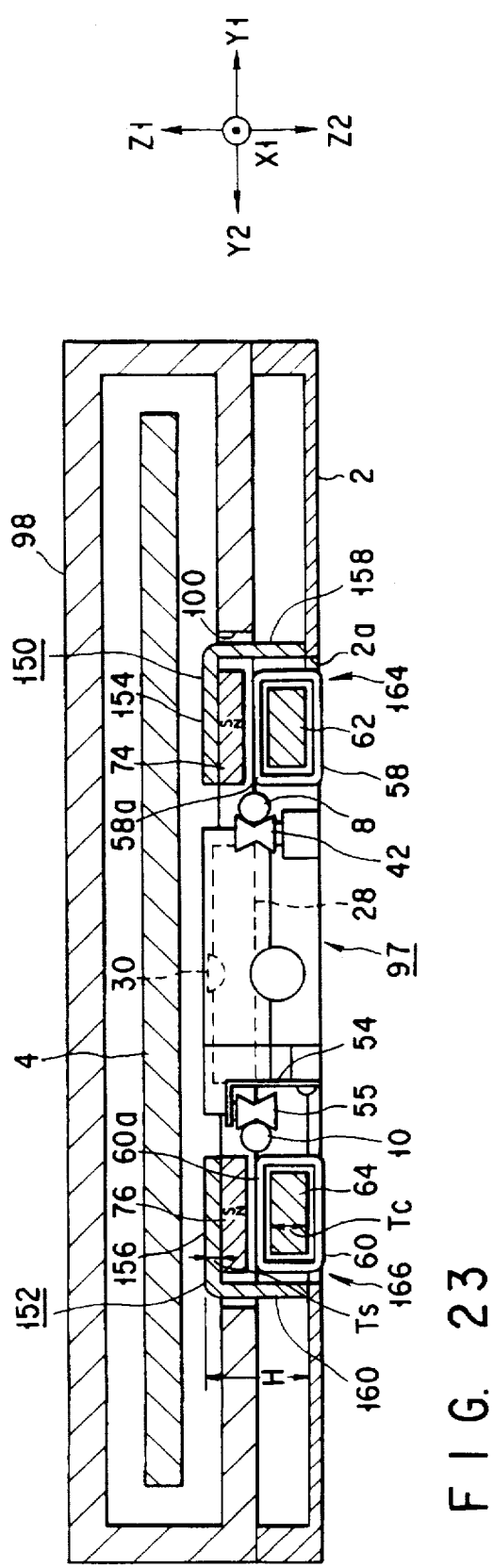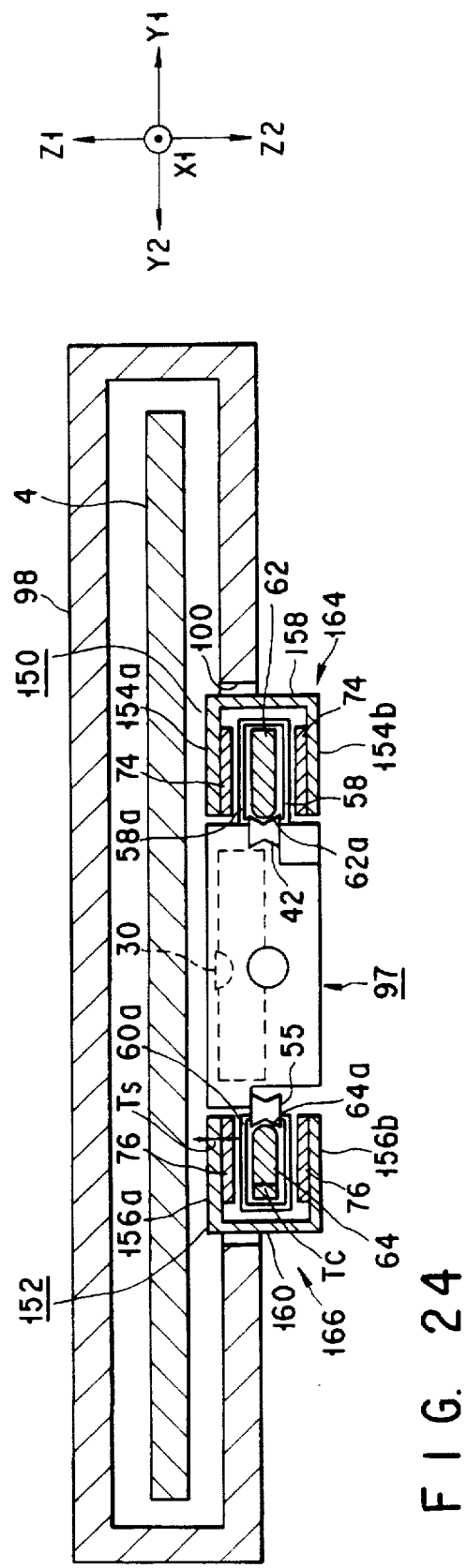

OPTICAL PICKUP

This application is a continuation of application Ser. No. 08/167,649, filed Dec. 14, 1993, now abandoned.

BACKGROUND OF THE INVENTION

1. Field of the Invention

The present invention relates to an optical pickup for recording data on and reproducing data from a recording medium, e.g., an optical recording disk such as an optical disk or an optomagnetic disk.

2. Description of the Related Art

An optical pickup (hereinafter called, simply "pickup") of general type comprises a movable assembly, two guide rails, and a drive mechanism. The movable assembly has an objective lens. Guided by the guide rails, the assembly can be moved by the drive mechanism in a radial direction of an optical recording disk (hereinafter called, simply "disk")—that is, in the tracking direction.

Jpn. Pat. Appln. KOKAI Publication No. 1-223674 discloses a pickup comprising a movable assembly which includes bearings each having a V-groove in its circumferential surface. The pickup further comprises two guide rails supporting the movable assembly and contacting the bearings, and a pre-loading member pushing one of the guide rails onto the bearing. The guide rails and the pre-loading member are located beneath the movable assembly, making it difficult to render the pickup sufficiently thin.

Each of the bearings comprises an outer race and an inner race. The outer race has a V-groove formed in its outer circumferential surface. The inner race fixed to the movable assembly. To eliminate a play between these rings, it is desirable that a pressure be applied the bearing in an axial direction, too. For this purpose it is necessary to displace the bearings respectively contacting the two guide rails from each other in the vertical direction. This would increase the thickness of the pickup.

Jpn. Pat. Appln. KOKAI Publication No. 2-106155 discloses a pickup, wherein the objective lens located in the movable assembly is moved relative to the disk. Some of the main components of the movable assembly are located above the two coils of the drive mechanism and, hence, function as loads. Against these loads, a counter-balancer needs to be arranged at the opposite side with respect to the coils. If a counter-balancer is so arranged, the movable assembly will be heavier and be less readily moved by the drive mechanism. Furthermore, the use of the counter-balancer will render the assembly thick. As a consequence, the pickup cannot be as small as desired. Neither can the coils be displaced at higher positions since a disk or a disk cartridge is located right above the pickup.

Jpn. Pat. Appln. KOKAI Publication No. 3-1375 discloses a pickup having a movable assembly and a drive mechanism for moving the movable assembly. The mechanism comprises two magnetic circuits each of which has a yoke and a permanent magnet. The yoke and the magnet of each circuit are arranged one upon another in the vertical direction. Due to this arrangement, the drive mechanism has a large thickness. Consequently, the pickup is relatively thick.

To render the pickup thinner, it may be proposed that one of the yokes be made thin. If the yoke is made thin, its cross section will decrease, and the magnetic-flux density of the yoke will inevitably be saturated. As a result, more magnetic fluxes will leak from the yoke, whereby the magnetic-flux density will lower. Due to a decrease in magnetic-flux density, if any, the drive mechanism would fail to move the movable assembly readily.

In most cases, a disk is contained in a disk cartridge 98 as illustrated in FIGS. 7 and 8. Mutual contact between the cartridge 98 and any component of a pickup should be prevented at all costs. To this end, the pickup must be made as thin as possible. None of the conventional pickups described above have not been designed to avoid that mutual contact.

SUMMARY OF THE INVENTION

The object of the present invention is to provide an optical pickup which is sufficiently thin, and any component of which remain out of contact with a cartridge containing an optical recording disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitutes part of the specification, illustrate presently preferred embodiments of the invention, and together with the general description given above and the detailed description of the preferred embodiments given below, serve to explain the principles of the invention.

FIG. 3 is an exploded view, explaining how a preloading spring is fastened to the carriage of the pickup;

FIGS. 4A and 4B are a top view and a sectional view, respectively, showing the bearing on the pre-load side and also the second guide rail on which the bearing abuts;

FIG. 5 is an exploded view showing the actuator incorporated in the pickup shown in FIG. 1;

FIG. 11 is a sectional view of the pickup shown in FIG. 9;

FIG. 12 is a sectional view showing a pickup according a third embodiment of this invention;

FIG. 13 is a partially cross-sectional front view of a pickup according to a fourth embodiment of the present invention;

FIG. 14 is a partially cross-sectional front view of a pickup according to a fifth embodiment of this invention;

FIG. 15 is a partially cross-sectional front view of a pickup according to a sixth embodiment of the present invention;

FIG. 17 is an exploded view of the pickup shown in FIG. 16;

FIG. 23 is a sectional view of the pickup shown in FIG. 22;

FIG. 24 is a sectional view showing a pickup according to an eleventh embodiment of the invention;

DETAILED DESCRIPTION OF THE PREFERRED EMBODIMENTS

Several embodiments of the present invention will be described, with reference to the accompanying drawings. In each of the drawings, an X axis indicates a direction parallel to the radial direction, i.e., the tracking direction, a Y axis represents a tangent to a track formed on the disk, and a Z axis shows a direction perpendicular to the recording surface of the disk.

Figure 1:
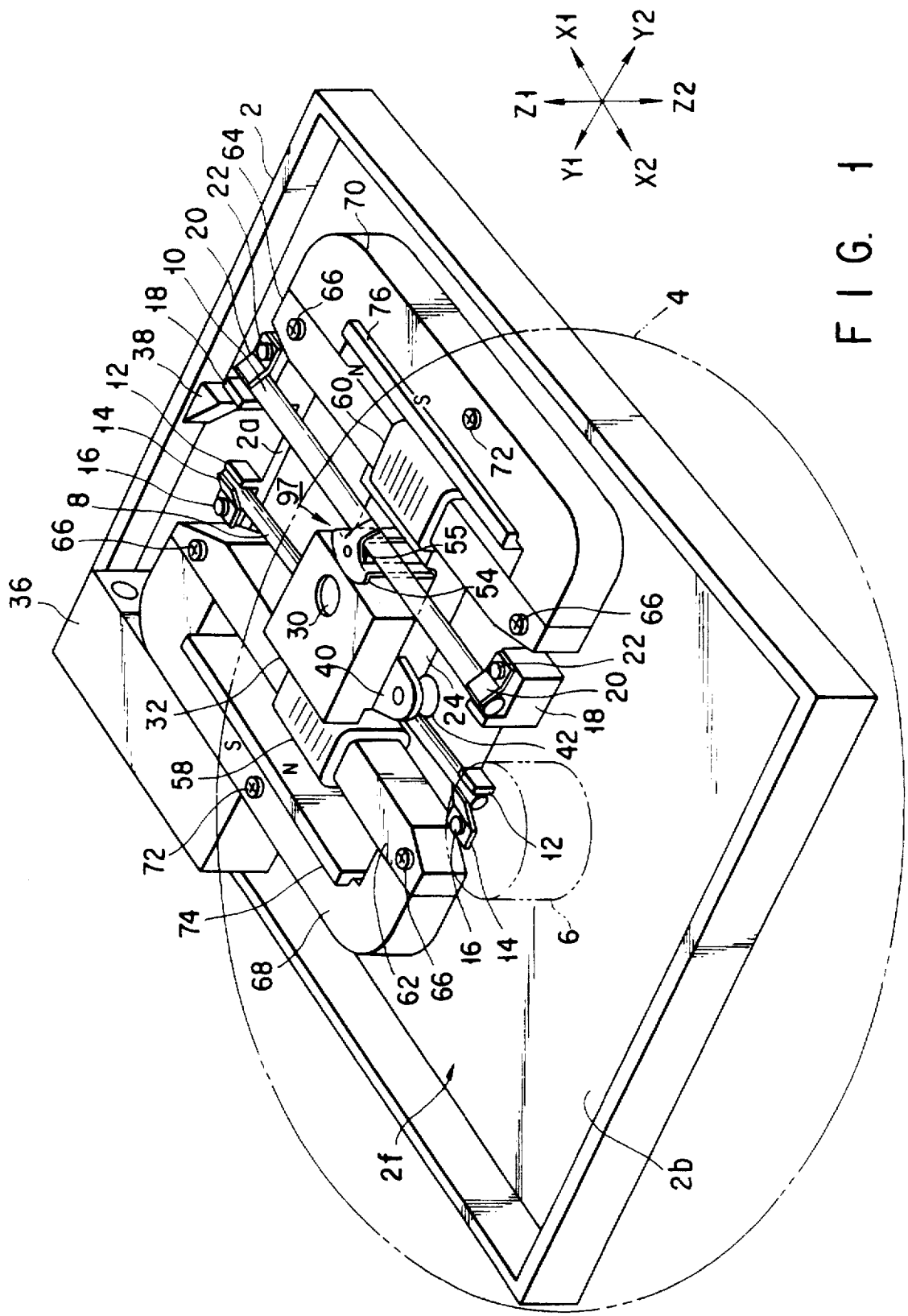
FIG. 1 is a perspective view of a pickup according to a first embodiment of the present invention.

FIGS. 1 to 8 show a pickup according to a first embodiment the invention. As shown in FIG. 1, the pickup has a deck base 2 (hereinafter referred to, merely as "base"). The base 2 has a recess 2f in its upper surface and a lightening hole 2a in its substantially center portion. The recess 2f of the base 2 has a bottom 2b. A spindle motor 6 is mounted and fixed on the bottom 2b of the recess. The motor 6 is used to rotate an optical disk 4 (hereinafter called "disk") which is one type of an optical recording disk.

Laid on the bottom 2a of the recess 2f are a first guide rail 8 and a second guide rail 10, both extending parallel to the X axis. The rail 8 is located on the $Y_1$-side of the base 2, whereas the rail 10 is located on the $Y_2$-side thereof. The first guide rail 8 serves as reference guide rail.

A stopper 12 is formed on the bottom 2b of the recess 2f of the base 2. Two plates 14 push the ends of the first guide rail 8 onto the stopper 12 and the bottom 2b of the recess 2f, respectively. Each plate 14 is bent at the middle and fastened to the base 2 by means of screws 16. The first guide rail 8 is thereby firmly secured to the bottom 2b of the recess 2f.

As described above, the second guide rail 10 is laid on the bottom 2b of the recess 2f. To be more precise, the ends of the second guide rail 10 are respectively held on two rail bases 18, formed on the bottom 2b of the recess 2f, by means of plates 20 and screws 22. Hence, the second guide rail 10 is located above the bottom 2b of the recess 2f.

Figure 2:
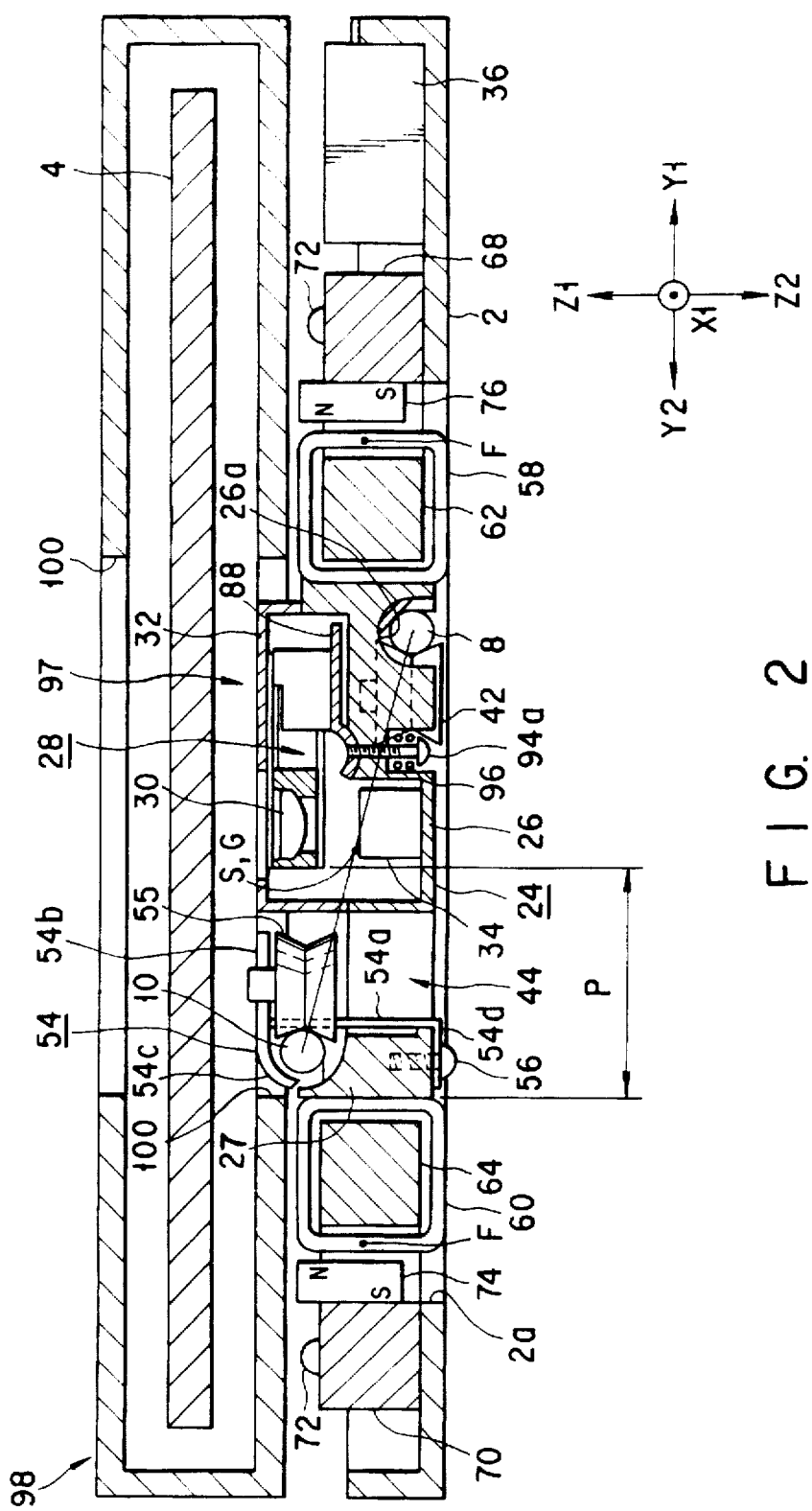
FIG. 2 is a sectional view of the pickup shown in FIG. 1, taken along the Y-Z plane.

A carriage 24 is movably mounted on the guide rails 8 and 10. As shown in FIG. 2, the carriage 24 has a housing 26 and a support section 27. The housing 26 is located on the $Y_1$-side of the base 2, and the support section 27 on the $Y_2$-side thereof. The housing 26 has an opening on the top.

As can be seen from FIG. 2, the housing 26 has a groove 26a formed in the lower surface and extending along the direction of the X axis. The groove 26a has a substantially semicircular cross section. The first guide rail 8 is loosely inserted in the groove 26a such that a very thin space is kept between them. As a result, two bearings 42 (later described) will not slip from the first guide rail 8 when an impact is applied to the pickup externally.

The housing 24 contains an actuator 28 for moving an objective lens 30 (later described) which is located within the housing 24, too. The objective lens 30 is exposed to the outside through the opening made in the top of the housing 24. A cover 32 covers the top of the housing 24, but not the objective lens 30.

The housing 26 also contains a mirror 34 which is located below the objective lens 30. The housing 26 has a light-guiding hole (not shown) in its $X_1$-side. This hole is so positioned as to guide light to the mirror 34, which reflects the light onto the objective lens 30.

Referring back to FIG. 1, a fixed optical system 36 is mounted in one corner of the recess 2f of the base 2. The fixed optical system 36 is designed to emit light in the direction of the arrow $Y_2$. A mirror 38 is fastened to the base 2 for reflecting the light in the direction of the arrow $X_2$. The light-guiding hole of the housing 26 is so positioned as to allow the passage of the light which has been reflected by the mirror 38.

Two projections 40 protrude the $X_1$- and $X_2$-sides of the carriage 24, respectively, though only one projection 40 is seen in FIG. 1. Both projections 40 are arranged near the first guide rail 8. The protections 40 have a hole each. The shaft of one of two first bearings 42 has its upper end portion fitted in the hole of the projection 40 shown in FIG. 1. Similarly the shaft of the other first bearing 42 has its upper end portion fitted in the hole of the projection 40 (not shown). Each first bearing 42 has a V-groove made in its circumferential surface and abuts on the first guide rail 8 at the V-groove.

As best shown in FIG. 3, the support section 27 of the carriage 24 has an opening 44. A platform 46 is formed on a lower part of the $Y_2$-side wall 27a of the support section 27. The platform 46 extends from the $Y_2$-side surface 44a of the opening 44 in the direction of the arrow $Y_1$. A projection 48 protrudes upwards from the top of the $Y_2$-side wall 27a of the support section 27. The projection 48 has a curved surface 50 which is smooth and continuous to the top surface of the support section 27. The surface 50 is curved in substantially parallel to a part of the surface of the second guide rail 10, as is seen in FIG. 4B.

A pre-loading spring 54 is located, in part, in the opening 44 of the support section 27. The spring 54 is made of stainless steel. It has two legs 54a and a first connecting plate 54b. The legs 54a function as springs. The first connecting plate 54b extends in the direction of the arrow Y, and connects the upper ends of the legs 54a. The first connecting plate 54b has a hole, in which the shaft of a bearing 55 of the same shape as the bearings 42 (FIG. 2) is fitted in place. As shown in FIG. 4B, the bearing 55 is located below the first connecting plate 54b, and its greater part is positioned on the $Y_1$-side with respect to the legs 54a.

As shown in FIG. 3, a tongue-shaped stopper 54c projects from the middle portion of the first connecting plate 54b. As clear from FIG. 4B, the stopper 54c extends virtually parallel to a part of the surface of the second guide rail 10 and is slightly spaced therefrom.

As shown in FIG. 3, a second connecting plate 54d connects the lower ends of the legs 54a. The second connecting plate 54d extends parallel to the Y axis. As seen from FIG. 4B, the plate 54d is fastened to the lower surface of the $Y_1$-side wall 27a of the support section 27 by screws 56, whereby the lower ends of the legs 54a abut on the platform 46.

The middle portions of both legs 54a are resiliently bent toward the $Y_2$-side surface 44a of the opening 44 (FIG. 3), applying a reaction pressure onto the bearing 55 and biasing the bearing 55 toward the second guide rail 10. As a result, the bearing 55 abuts on the rail 10 at the V-groove formed in the circumferential surface of the bearing 55 and defining two contact points 55a.

As is best shown in FIG. 4B, the curved surface 50 of the projection 48, the tongue-shaped stopper 54c and the bearing 55 surround the second guide rail 10. Furthermore, the bearing 55 is rotatably attached to the pre-loading spring 54. Hence, the bearing 55 would not slip from the second guide rail 10.

As shown in FIG. 2, two access coils 58 and 60 are fastened to the $Y_1$- and $Y_2$-sides of the carriage 24, respectively. Each of the coils 58 and 60 is wound around an axis which is parallel to the arrow X. Center yokes 62 and 64, each extending parallel to the X axis, are inserted in the access coils 58 and 60, respectively. As can be understood from FIG. 1, both ends of each center yoke are fastened to the base 2 by screws 66. Two U-shaped side yokes 68 and 70 are connected to the center yokes 62 and 64, respectively. More precisely, each of side yokes 68 and 70 is fixed to the base 2 by a screw 72, and has its ends connected to the ends of each center yokes 62 and 64.

A magnet 74 is arranged between the center yoke 62 and the middle portion of the side yoke 68. Also, a magnet 76 is arranged between the center yoke 64 and the middle portion of the side yoke 70. The magnets 74 and 76 are fixed to the side yokes 68 and 70, respectively. Each magnets 74 and 76 is a thin strip extending along the X axis, having N and S poles arranged along the Y axis, that is, in the direction of thickness. Two magnetic gaps are defined—a first one between the center yoke 62 and the magnet 74, and the second one between the center yoke 64 and the magnet 76. Placed in the first magnetic gap is one side of the access coil 58; placed in the second magnetic gap is one-side of the access coil 60.

The actuator 28 will now be described in detail, with reference to FIGS. 5 and 6.

As shown in FIG. 5, the actuator 28 comprises a star-shaped holder 78 having an opening 78a. The objective lens 30 is fitted in the opening 78a of the holder 78. The holder 78 has four projections 78b extending radially from the holder 78. Two adjacent projections 78b define a corner 78c, and the remaining two adjacent projections 78b define a corner 78c. Two focusing coils 80, each shaped like a square cylinder, are positioned and fixed in the corners 78c, respectively. Furthermore, two tracking coils 82, each shaped like a square frame, are attached respectively to two projections 78g protruding from two opposing sides 78d of the holder 78.

Four projections 78e extend from the $Y_2$-side of the holder 78. Two of the four projections 78e are located $X_2$-side of the holder 78 whereas the other two projections 78e $X_1$-side. The first projections 78e extend in the directions of the arrow Z, and the arrow $Z_2$ respectively. Similarly, the second projections 78e extend in the directions of the arrow Z, and the arrow $Z_2$, respectively.

Each of four projections 78e has a hole 78f which extends in parallel to the Y axis. Two rod metal spring 84a and 84b are connected to the holder 78, with their end portions inserted in the holes 78f of the first projections 78e. Similarly, two other rod metal springs 84c and 84d are connected to the holder 78, with their end portions inserted in the holes 78f of the second projection 78e. The rod metal springs 84a to 84d have their other ends inserted in the four holes 86a made in the corners of a rectangular fastening member 86.

The rod metal springs 84a and 84c are located below the objective lens 30, whereas the springs 84b and 84d are arranged above the objective lens 30. The end portions of each spring are displaced from each other along $X_1$ or $X_2$, but are parallel to each other and also to the corresponding end portions of any other rod metal spring, respectively. The intermediate portion of each spring, which connects the end portions thereof, is inclined to the Y axis such that the rod metal springs 84a to 84d are spaced apart along the X axis, shorter near the holder 78 than in the vicinity of the fastening member 86.

Of these springs, the spring 84c is in the path of a light beam applied to a mirror 34 arranged below the holder 78.

The ends portions of the springs 84a to 84d, which are located close to the holder 78, are positioned remote from the fastening member 86. The springs 84a to 84d therefore have a long effective length each. Hence, the pickup can be narrow along the Y axis.

As shown in FIG. 5, the fastening member 86 has a block 86b extending toward the holder 78, that is, in a direction parallel to the Y axis. The block 86b has a V-notch in its $Y_1$-side. Two projections 86c protrude downwards from the lower side of the block 86b. The projections 86c are fitted in two holes 88a made in an amount plate 88, thus positioning the fastening member 86 with respect to the mount plate 88.

The mount plate 88 has been formed by bending an iron plate. It has a pair of first bent portions 88b and a pair of second bent portions 88d. The first bent portions 88b extend upwards, and the second bent portions 88d oppose the $Y_2$-sides of the bent portions 88b, respectively. The second bent portions 88d have been formed by bending the tips of third bent portions 88c.

Two magnets 90 are secured to the $Y_2$-sides of the first bent portions 88b. These magents 90 are magnetized in the direction of thickness, and are so positioned that the N-pole of the $X_1$-side magnet 90 and the S-pole of the $X_2$-side magnet 90 face in the direction of the arrow $Y_1$.

Figure 6:
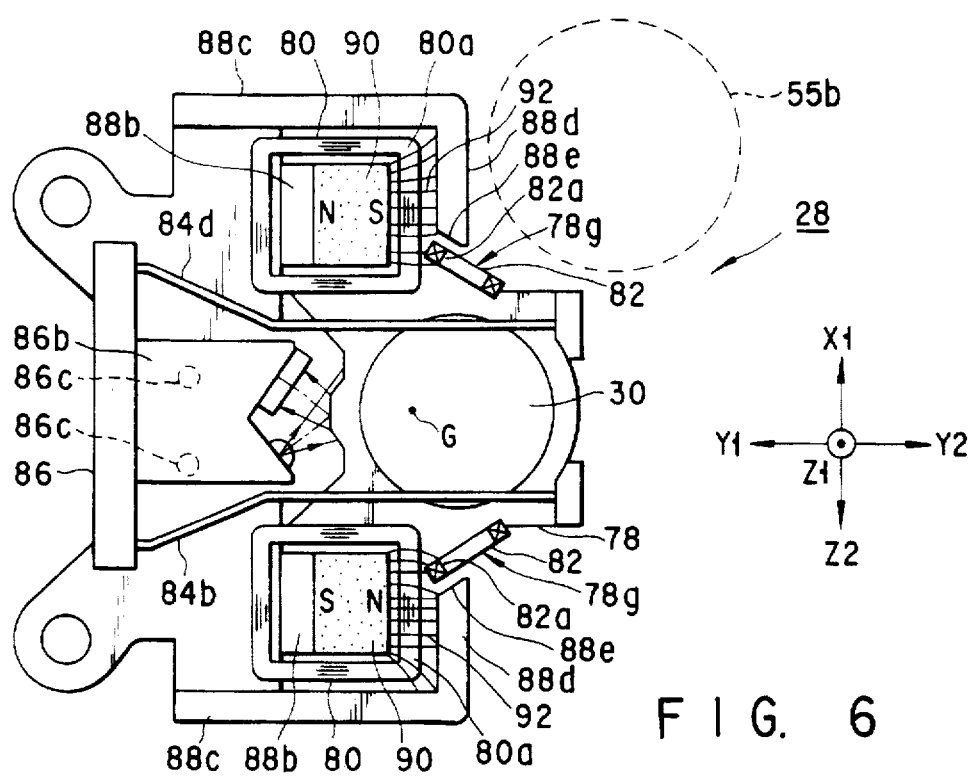
FIG. 6 is a plan view of the actuator.

Since the magnets 90 are secured to the first bent portions 88b of the mount plate 88, they oppose the second bent portions 88d, spaced apart therefrom, as is illustrated in FIG. 6. Therefore, a main magnetic gap 92 is provided between each first bent portion 88b and the associated magnet 90.

Each first bent portion 88b and the associated magnet 90 are loosely inserted in one of two focusing coils 80.

The distal end portion 88e of each second bent portion 88d is inclined to the Y axis, and opposes that side 82a of the associated tracking coil 82 which extends parallel to the Z axis.

To assemble the holder 78 and the springs 84a to 84d together, the holder 78 and the fastening member 86 are positioned by means of jigs. Then, the springs 84a to 84d are inserted, at one end, into the holes 78f of the second projections 78e of the holder, and at the other end, into the four holes 86a of the member 86. Thereafter, adhesive is applied into the holes 78f and 86a, thus cementing the springs 84a to 84d to the holder 78 and the fastening member 86.

The mount plate 88 is fastened to the housing 26 (FIG. 2) of the carriage 24 by means of three screws 94. A coil spring 96 is mounted around one 94a of these screws as shown in FIG. 5. The actuator 28 mounted on the mount plate 88 is located within the housing 26, and can be movable up and down by turning the screw 94a for its positioning relative to the housing 26.

The actuator 28 and the various components mounted on the carriage 24 constitute a movable assembly 97.

Figures 7, 8:
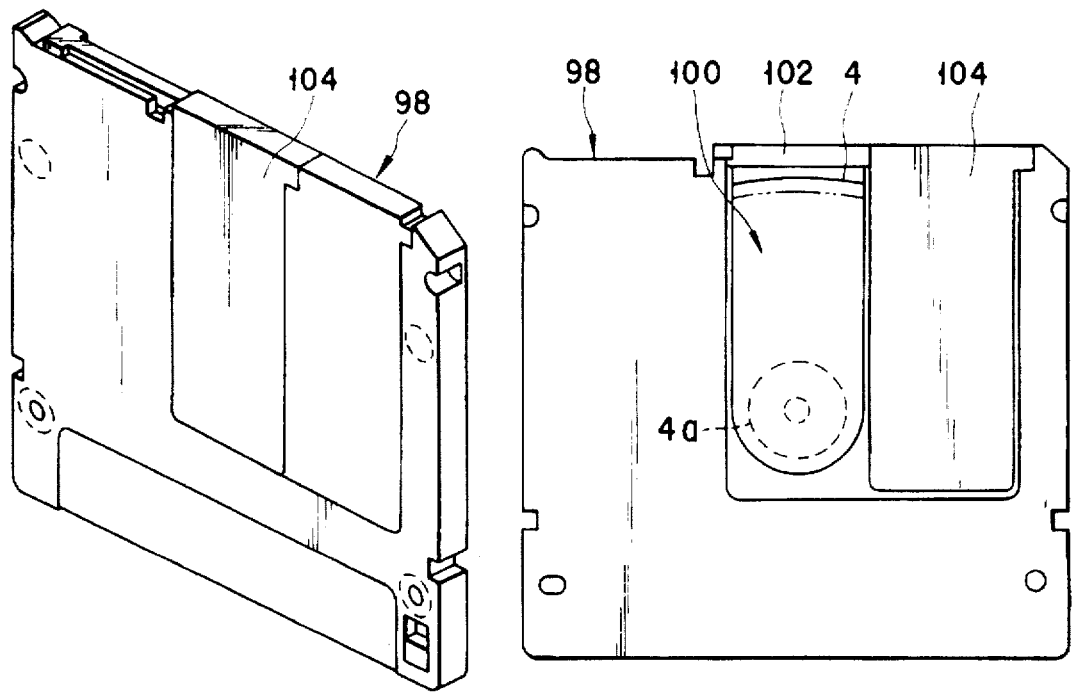
FIG. 7 is a perspective view of a disk cartridge.
FIG. 8 is a view showing the lower side of the cartridge.

FIGS. 7 and 8 show a cartridge 98 containing the disk 4. The cartridge 98 is of the type disclosed in ISO/IEC10090, 1992 (E). As shown in FIG. 8, the cartridge 98 has a rectangular window 100. The window 100 exposes the hub 4a of the disk 4 and a portion of the disk 4 extending from the hub 4a. A bridge 102 defines the upper end of the window 100. A shutter 104 is slidably mounted on the bridge 102, and can be moved to cover the window 100.

As shown in FIG. 2, when the disk 4 in the cartridge 98 is connected to the shaft of the spindle motor 6 (FIG. 1), a part of the movable assembly 97 and a part of the second guide rail 10 are arranged within the window 100 of the cartridge 98. This arrangement is obtained by following two constructions.

1. As will be described below, almost all components of the actuator 28 are located in the region of $Y_1$-side from the objective lens 30, and only little part of the actuator 28 is arranged in the region of $Y_2$-side from the lens 30, whereby the bearing 55 can be positioned closer to the objective lens 30.

2. The second guide rail 10 is shifted from the first guide rail 8 to the $Z_1$-direction.

The operation of the pickup described above will be described in the following.

First, it will be explained how the actuator 28 performs its function. When a current flows through the focusing coils 80 or the tracking coils 82, it interacts with the magnetic fields of the magnets 90. The coils 80 or 92 therefore generate a force, which drives the objective lens 30 in the focusing direction (i.e., along Z axis) or in the tracking direction (i.e., along X axis).

The holder 78 is movably supported by the springs 84a to 84d. The springs 84b and 84d are located above the objective lens 30, whereas the springs 84a and 84c are located below the objective lens 30. Hence, the distance between the upper springs 84b and 84d and the lower springs 84a and 84c is kept while making short the distance between the lower springs 84 and 84c and the recording surface of the disk 4 (FIG. 2), whereby the pickup can be made thin. Still further, since the spring 84c is in the path of a light beam applied to a mirror 34, the objective lens 30 is closer to the light beam than otherwise. This also helps to reduce the thickness of the pickup.

As is seen from FIG. 6, the components (e.g., the coils and the magnets) for driving the objective lens 30 are arranged in the $Y_1$-side region from the axis of the objective lens 30, and the springs 84a to 84d extends in $Y_1$ direction with respect to the lens 30. The greater part of the actuator 28 is therefore placed in a region of $Y_1$-side from the lens 30. Only little part of the actuator 28 is located in a region of $Y_2$-side from the lens 30.

It will now be describe how the movable assembly 97 (hereinafter called "assembly") performs its function. When electric currents flow through the coils 58 and 60 shown in FIG. 2, they interact with the magnetic fields of the magnets 74 and 76, generating a force driving the assembly 97 in parallel to the X axis.

The assembly 97 moves, while two bearings 42 (only one shown) are put in contact with the guide rails 8 and the pre-loading bearing 54 is set in contact with the second guide rail 10. The pre-loading spring 54 applies a pressure onto the bearing 55 and the second guide rail 10 in the direction of the arrow $Y_2$. The assembly 97 can thereby move, without vibrating or shaking.

As shown in FIG. 2, the guide rails 8 and 10 are displaced vertically from each other. The midpoint S on a line connecting the axes of the guide rails 8 and 10 coincides with the gravity center G of the assembly 97. Since the rails 8 and 10 are so displaced, components of force can be applied to the bearings 42 and 55 in their axial direction (i.e., along the Z axis). Therefore, the play between the inner and outer races of each bearing is eliminated.

As indicated above, that part of the actuator 28 which exists in a region of $Y_2$-side from the objective lens 30 is smaller than the remaining part. Hence, the second guide rail 10, part of the pre-loading spring 54, and the bearing 55 are arranged in a space "P" between the actuator 28 and the $Y_2$-side of the window 100 of the cartridge 98. That is, a part of the support for the assembly 97 is located such that it is arranged within the window 100 of the cartridge 98. Thus, the thickness of the pickup can be reduced.

The bearing 42 is spaced apart from the bearings 55 in the direction of the arrow $Z_1$ and located far from the second connecting plate 54d of the pre-loading spring 54. The legs 54a of the spring 54 can therefore be so long that the stress on them is made smaller whereby reliability can increase.

The function of the pre-loading spring 54 will be explained. As shown in FIG. 2, when the assembly 98 is mounted on the guide rails 8 and 10, both legs 54a of the spring 54 bend a little in the direction of the arrow $Y_1$, whereby the bearing 55 is displaced toward the $Y_1$-side. As a result of this, the bearing 55 applies a pressure onto the second guide rail 10. The legs 54a, both being long and thin, serve to decrease the size of the assembly, measured along the X axis.

Visco-elastic layers may be bonded to the legs 54a or visco-elastic material may be fitted in the gaps between the legs 54a and the carriage 24. In this case, the visco-elastic substance absorbs the resonance which the legs 54a make as the assembly 97 moves or as the vibration is applied from the outside. Therefore, no unnecessary displacement of the assembly 97 occurs so that the optical axis of the objective lens 30 does not easily shift, whereby obtaining the stable servo-characteristics.

As shown in FIG. 2, the upper end portions of the magnets 74 and 76 project upwards from the upper surfaces of the side yokes 68 and 70. In other words, the center positions of respective magnets 74 and 76 in the direction of Z-axis are displaced upwards (i.e., in the direction of the arrow $Z_1$)

with respect to the center positions in the direction of Z-axis of side yokes 68 and 70, center yokes 62 and 64, and access coils 58 and 60. The coils 58 and 60 are so positioned that their upper surfaces are substantially at the same level as the upper ends of the magnets 74 and 76. The magnetic-flux distribution in the gaps between the center yokes 62 and 64 and the magnets 74 an 76 greatly depends upon a force F generated by the coils 58 and 60. This force F can be shifted upwards from the centers of center yokes 62 and 64 if the magnets 74 and 76 are positioned in the above-mentioned manner.

The gravity centers of the coils 58 and 60 exist lower (that is, closer to the $Z_2$-side) than the point where the force F acts. The two bearings 42 (only one shown), both contacting the reference guide rail 8, are arranged in the lower section of the assembly 97, whereas the pre-loading bearing 55 is arranged in the upper one of the assembly 97.

The counter-balancer (not shown) positioned below the assembly 97 can, therefore, be of a relatively small and light one. Thus, not only can the assembly 97 be light as a whole, but also can the thickness of the assembly 97 (i.e., the dimension along Z axis) be decreased.

The bearing 55 for pre-loading may be place on the $X_1$-side and the $Y_2$-side relative to the actuator 28, for example at the position indicated by the broken lines 55b in FIG. 6. Then, the size of the pickup will be more reduced in the direction of the axis Y.

The first guide rail 8 is shifted from the second guide rail 10 in the $Z_2$-direction to be placed in $Z_1$-side of the actuator 28, whereby minimizing the assembly 97 in the direction of Y-axis.

Figure 9:
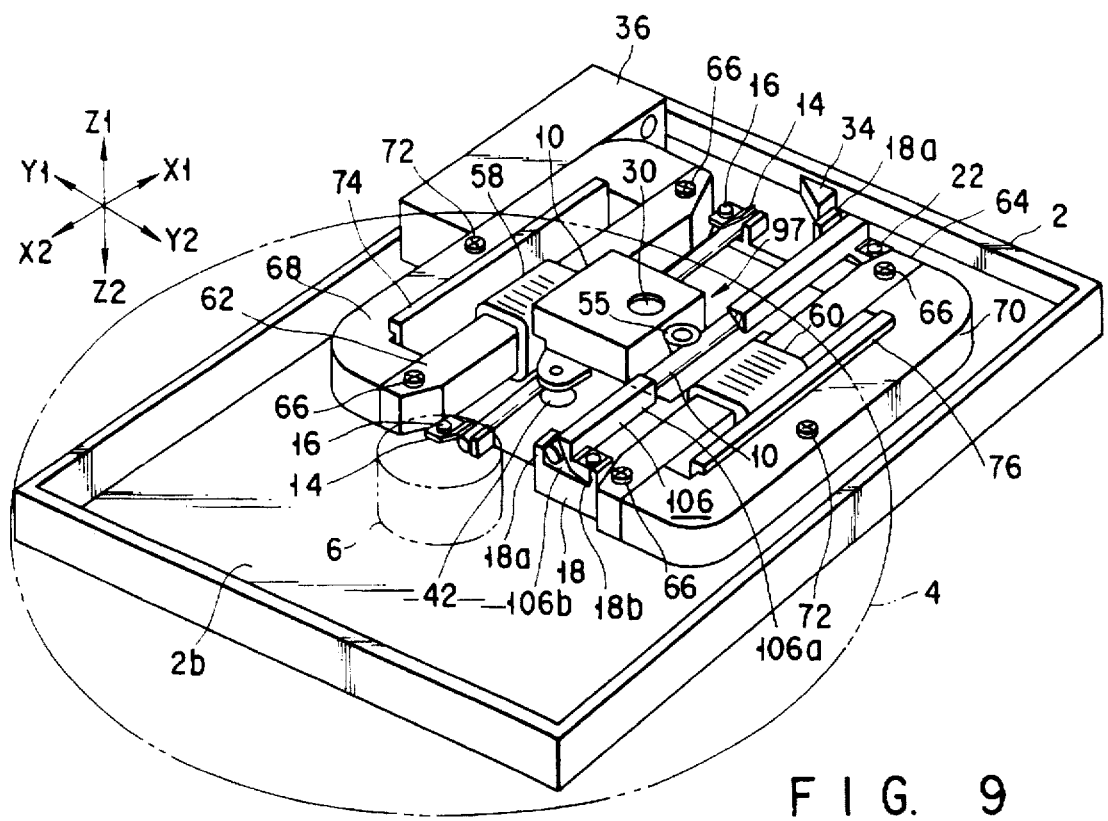
FIG. 9 is a perspective view of a pickup according a second embodiment of the present invention.
Figure 10:
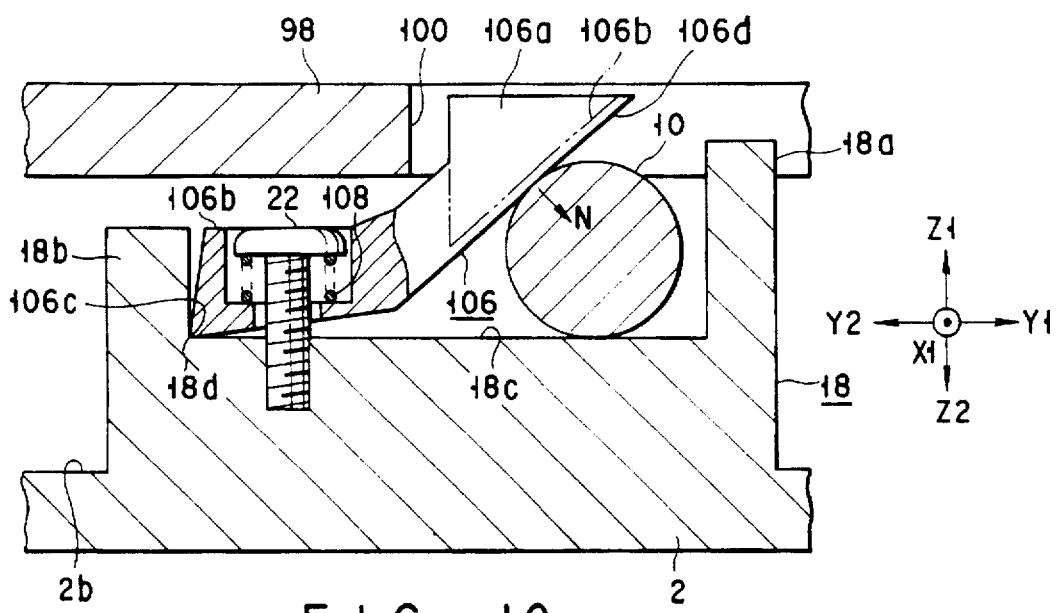
FIG. 10 is a sectional view showing the condition in which the rail holder and the second guide rail, both incorporated in the pickup of FIG. 9, contact each other.

FIGS. 9 to 11 show a pickup according to a second embodiment of the invention. The component of the second embodiment which are identical or similar to those of the first embodiment will be designated at the same reference numerals in FIGS. 9 to 11 and will not be described in detail.

In the second embodiment, as shown in FIG. 9, a rail holder 106 made of stainless steel is used, instead of the pre-loading spring 54 (FIG. 1), to apply a preload onto an assembly 97. The rail holder 106 has a trigonal bar 106a which has a cross section of a substantial right angled triangle. The rail holder 106 has two contacts 106b at its ends, respectively. Each contact 106b extends substantially in the direction of the arrow $Y_2$. As shown in FIG. 10, the contacts 106b are adjustably connected by screws 22 to the upper surfaces 18c of the rail bases 18. A coil spring 108 is wound around each screw 22 and compressed between each contact 106b and the head of the screw 108.

Two stoppers 18a and 18b are formed on the two rail bases 18, respectively. The stopper 18a, which is located at the $Y_1$-side of the pickup, is spaced apart from the second guide rail 10 as long as the guide rail 10 abuts on the bearing 55 as shown in FIG. 9. The stopper 18b adjoins the upper surface 18c of the rail base 18 at an interface 18d, which contacts the corner 106c of each contact 106b of the rail holder 106. The corner 106c has been formed by polishing. The contact 106b has an inclined surface 106d which abuts on the second guide rail 10. The inclined surface 106d has been formed by polishing.

Biased by the spring 108 compressed between the contact 106b and the screw 22, each contact 106b applies a pressure N onto the second guide rail 10 in the direction of an arrow N. Due to the pressure N the second guide rail 10 is pushed onto the bearing 55 (FIG. 9), thereby eliminating a play between the rail 10 and the bearing 55.

The inclined surfaces 106d of the two contacts 106b are connected by the trigonal bar 106a which extends parallel to the X axis. The corners 106c of both contacts 106b contact the interface 18d. The rail holder 106 is thereby prevented from rotating around the axis Z, holding the second guide rail 10 in parallel to the X axis.

As shown in FIG. 10, the upper surface 18 of each rail base 18 is at a level above the bottom 2b of the recess 2f of the base 2. The trigonal bar 106a therefore extends above the second guide rail 10. Hence, the bar 106a is located within the window 100 of the cartridge 98. Since the springs 108 are provided at the ends of the rail holder 106, the rail holder 106, the screws 22 and the springs 108 do not interfere with the mechanism for driving the assembly 97. Nor do these components increase the thickness of the pickup, i.e., the dimension thereof along the Z axis.

The rail holder 106 may be formed by die-casting zinc, and the inclined surface 106d may be formed by bonding a thin stainless steel layer to the zinc diecast holder 106. If this method is used, it will be unnecessary to polish a side of the rail holder 106 whereby helping reduce the manufacturing cost of the pickup.

The second embodiment shown in FIGS. 9 to 11 is identical to the first embodiment, in operation and advantages, and in structural features other than those described above.

With reference to FIG. 12 a third embodiment of the invention will be described which is a modification of the pickup according to the second embodiment.

The third embodiment is characterized in that a first guide rail 8 and two bearings 42 are located above a bearing 55 and a second guide rail 10, or displaced upwards therefrom, which is vice versa with the first and second embodiments.

As seen from FIG. 12, the guide rails 8 and 10 extend along the X axis, in parallel to each other, and are arranged in the openings 110 and 112 of a carriage 24, respectively. The pickup has a rail holder 106 which is similar in shape to the one used in the second embodiment. The bar 106a of the rail holder 106 is located between a cartridge 98 and that part of the carriage 24 which is positioned right above the second guide rail 10. This serves to prevent the thickness of the pickup from increasing. In addition, the bar 106a can be easily laid out, because the second guide rail 10 for pre-loading is positioned lower than the first guide rail 8.

In the third embodiment (FIG. 12), an actuator 28 has a drive means which comprises coils and magnets arranged along the Y axis and on both sides of an objective lens 30. The clearance between the pickup and the cartridge 98 is, therefore, comparatively small. A galvano mirror 114 is employed in place of the mirror 34 used in the second embodiment.

The pickup according to the third embodiment is identical in structure to the second embodiment, except for the features described above. The third embodiment can be applied to a pickup having guide rails 8 an 10 which are not shifted from each other in vertical direction.

A fourth embodiment of the invention, which is also a pickup, will be described with reference to FIG. 13. This pickup is characterized in that the two holes made in a carriage 24 are inclined by an angle e to the z axis and around the X axis, and that the shafts of bearings 42 and 55 are fitted in these holes thus inclined. The bearings 42 and 55, thus connected to the carriage 24, are located at the same height.

The fourth embodiment (FIG. 13) is also characterized in that a first guide rail 8 abuts on the bearings 42 at the $Y_1$-side and a second guide rail 10 abuts on the bearing 55 at the $Y_2$-side, respectively. The guide rails 8 and 10 are thereby displaced by distance $\Delta Z$ from the shafts of the gearings 42 and 55. This helps to reduce the dimension of each bearing and that of each guide rail, along the Z axis.

Except for the features indicated above, the fourth embodiment is identical in structure to the third embodiment shown in FIG. 12.

With reference to FIG. 14, a fifth embodiment of the invention will be described which is a modification of the pickup according to the third embodiment.

In the fifth embodiment, the axes of bearings 42 and 55 are parallel to the Z axis and at the same height. The surfaces 2c and 2d of two rail bases, on which guide rails 10 and 8 are mounted respectively, are inclined around the X axis at angle $\alpha$ (5° to 20°) to the XY plane. Thus, the guide rail 8 applies a pressure onto the bearings 42, and the guide rail 10 apply a pressure onto the bearing 55, in a direction inclined to the XY plane, generating a force acting on the bearings 42 and 55 in their axial direction.

In the fifth embodiment, the Z-axis dimension of each of the support components, such as the guide rails and the bearings, is decreased, and a force is applied to each bearing in its axial direction.

Except for the specific features described above, the fifth embodiment is identical in structure to the third embodiment shown in FIG. 12.

With reference to FIG. 15 a sixth embodiment of the present invention will be described which is also a pickup.

In the sixth embodiment, guide rails 8 and 10 are fixed on a base 2 and positioned at the same height. Two bearings 42 have their axes set parallel to the Z axis. A bearing 55 has its axis inclined by an angle $\beta$ (5° to 20°) to the Z axis, and is put in contact with the second guide rail 10. The legs 54a of a pre-loading spring 54 are located at the $Y_1$-side of the bearing 55. The second connecting plate 54d of the spring 54 extends parallel to the XZ plane, and can be rotated around the Y axis when it is connected to the carriage 24, so that the axis of the bearing 55 may intersect at right angles to the X axis.

Except for the features indicated above, the sixth embodiment is identical in structure to the first embodiment (FIGS. 1 to 8).

Since the axis of the bearing 55 is so inclined, a force is applied to the bearing 55 or the second guide rail 10 in the axial direction thereof. The inclination of the bearing 55 can be achieved by bending the first connecting plate 54b of the spring 54 at an appropriate angle. The axes of the bearings 42 need not be inclined at all. Neither is it necessary to form step portions on the base 2, for supporting the guide rails 8 and 10. This makes it possible to machine the base 2 and the carriage 24 with high precision.

Furthermore, since the inclination of the bearing 55 is fixed once adjusted to a desirable value, the second guide rail 10 and the bearing 55 are scarcely worn by friction. This serves to enhance the reliability of the pickup. In the sixth embodiment, the axes of the bearings 42 may be inclined, not that of the bearing 55.

With reference to FIGS. 16 to 19, a pickup according to a seventh embodiment of this invention will be described, which is designed to record data on, and reproduce data from, an optomagnetic disk 4a (hereinafter called "disk 4a").

Figure 16:
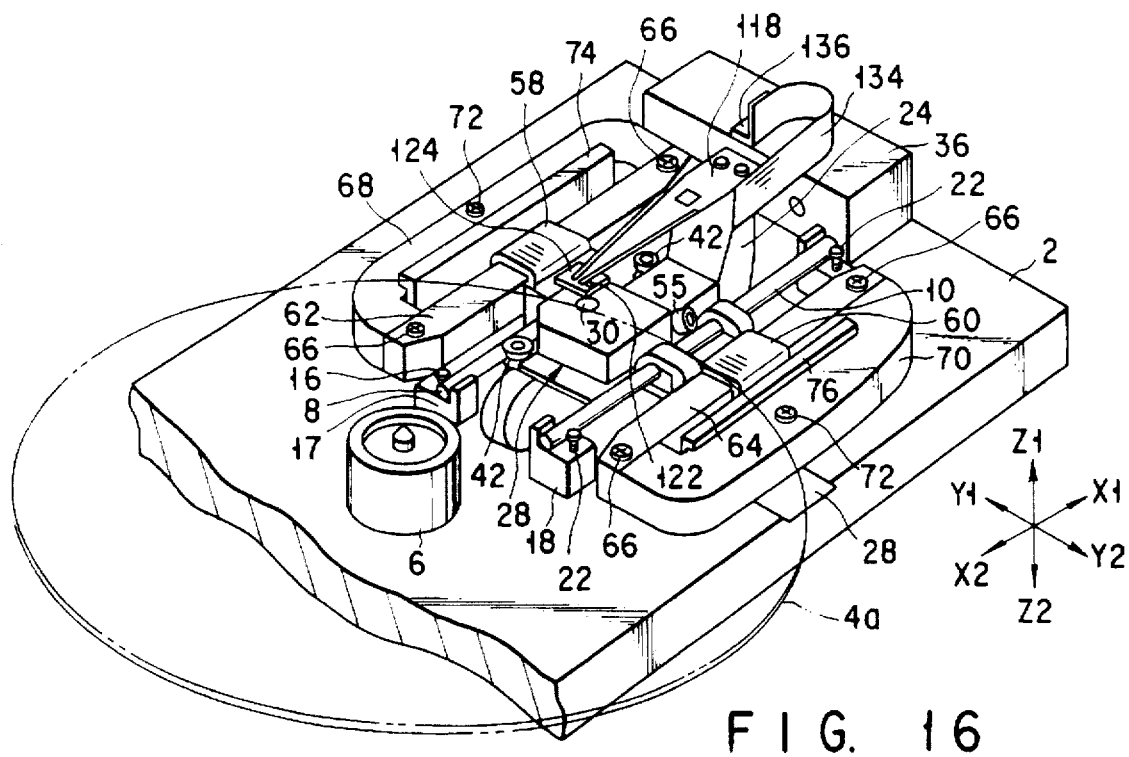
FIG. 16 is a perspective view a pickup according to a seventh embodiment of this invention.
Figure 18:
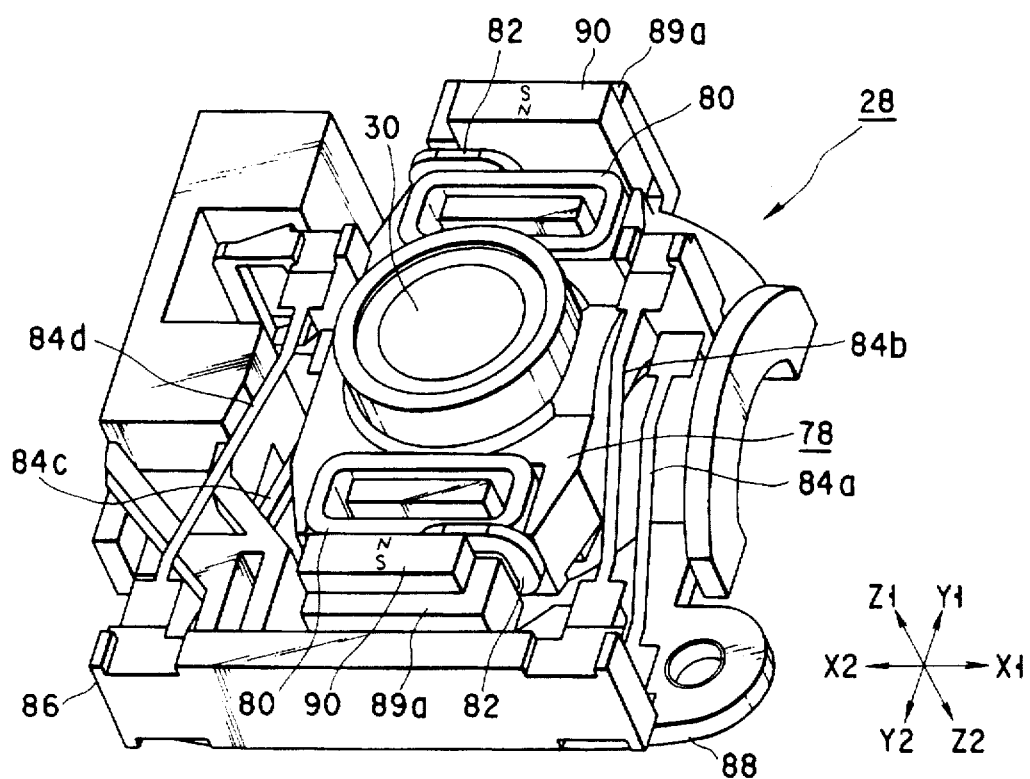
FIG. 18 is a perspective of the actuator used in the pickup shown in FIG. 16.

As shown in FIG. 17, a carriage 24 has two through holes 110 and 112 which are made in the $Y_1$-side portion and $Y_2$-side portion, respectively, and which extend parallel to the X axis. As shown in FIG. 16, two guide rails 8 and 10 loosely inserted in the holes 110 and 112. Access coils 58 and 60 are fastened to the $Y_1$- and $Y_2$-side of the carriage 24, respectively.

A head base 114 is formed on the $X_1$-side portion of the carriage 24. The head base 114 protrudes upwards. A leaf spring 118 extending along the X axis is fastened at its $X_1$-side end to the upper surface 116 of the head base 114 by means of two screws 120. A slider 124 is connected to the $X_2$-side end of the leaf spring 118. Mounted on the slider 124 is a coil 122 for applying a magnetic field to the recording surface of the disk 4a. The coil 122 and the slider 124 constitute a magnetic head.

When the disk 4a is not rotated, the slider 124 contacts the disk 4a, biased by the leaf spring 118. While the disk 4a is being rotated, the slider 124 floats a little above the disk 4a despite of the bias of the spring 118, by virtue of an air flow generated by the rotation of the disk 4a. The leaf spring 118 must be so long, and the gap between an objective lens 30 and the head base 114 must be so wide, that the slider 124 may interposed between the disk 4a and the objective lens 30.

The carriage 24 is made of aluminum by die-casting. The leaf spring 118 is made of Ni-Cr stainless steel. The stainless steel has a coefficient of linear thermal expansion of $17.3 \times 10^{-6}$/°C., which is very similar to that of aluminum, i.e., $23.6 \times 10^{-6}$/°C. Thanks to these specific selected materials for the carriage 24 and the spring 118, the displacement between the magnetic field, which the coil 122 generates, and the light spot, which the light emitted from the lens 30 forms on the disk 4a, falls well within an allowable range.

The carriage 24 and the leaf spring 118 may be formed of materials other than those specified in the preceding paragraph. Nevertheless, it is required that the difference in linear thermal expansion coefficient between the materials be 30% or less relative to each other in order to make the displacement between the magnetic field and the light spot fall within the allowable range.

As can be understood from FIG. 16, a fixed optical system 36 is mounted on a base 2 and so located as to emit a light beam along the X axis from a midpoint across the base 2 along the Y axis. As seen in FIG. 17, the carriage 24 has a through hole 125 for allowing the passage of the light beam emitted from the optical system 36. The carriage 24 also has two recesses 126 and 128. The first recess 126 is formed in the center portion of the carriage 24, thus lightening the carriage 24, and communicates with the through hole 125. The second recess 128 is formed in the $X_2$-side end portion of the carriage 24, communicates with the first recess 126, and has a substantially circular cross section taken along the XY plane.

A mirror 26 is fastened to the bottom of the second recess 126 of the carriage 24. An actuator 28 is connected to the carriage 24, for moving the carriage 24 such that the objective lens 30 is positioned right above the mirror 26. The mirror 26 reflects the light beam from the fixed optical system 26, onto the objective lens 30. The actuator 28 will be described in detail, with reference to FIG. 18.

The objective lens 30 is held by a lens holder 78. Two focusing coils 80 and two tracking coils 82 are fastened to the lens holder 78. Four leaf springs 84a to 84d are connected at one end to the lens holder 78, and at the other end to a fastening member 86. The fastening member 86 is fixed to the mount plate 88. Two outer yokes 89a are formed on the mount plate 88. Two magnets 90 are connected to the outer yokes 89a, respectively. Provided with the focusing coils 80, the tracking coils 82, the leaf springs 84a to 84d, the outer yokes 89a, and the magnets 90, the actuator 28 supports the objective lens 30 and can move the lens 30 along both directions of the X axis and of the Y axis.

As shown in FIG. 17, a first FPC (Flexible Printed Circuit) 130 is fastened, at its first end portion 130a, to the lower surface of the carriage 24. The first FPC 130 comprises a bent portion 130b and a second end portion 130c. The bent portion 130b extends in the direction of the arrow $X_2$, is bent at the middle portion and extends in the direction of the arrow $X_1$. The second end portion 130c extends in the direction of the arrow $Y_2$ and is fastened to the base 2.

As shown in FIG. 16, the bent portion 130b of the first FPC 130 is located between a spindle motor 6 and an assembly 97. Therefore, the bent portion 130b does not interrupts the light beam emitted from the optical system 36. An electric current is supplied from the first FPC 130 to the access coils 58 and 60 and also to the actuator 28.

As shown in FIG. 17, a second FPC 134 has its one end 134a fastened to the $Y_2$-side 132 of the head base 114. A plate 136 having an L-shaped cross section is connected to the other end of the second FPC 134. As shown in FIG. 16, the plate 136 is fastened to the optical system 36. An electric current is supplied from the second FPC 134 to an AE sensor (not shown) which is designed to detect the malfunction of the coil 122 and slider 124 of the magnetic head or the malfunction of the leaf spring 118. Located above the path of the light beam emitted from the optical system 36, the second FPC 134 does not interrupt the light beam.

An electric circuit 138 comprising a circuit for driving the head coil 122 and a pre-amplifier circuit for the AE sensor (not shown) is connected to the other end of the second FPC 134. The head coil 122, the AE sensor, and the circuit 138 are therefore located close to one another. Therefore, noise is more hardly generated than otherwise, and the assembly 97 is less massive than otherwise. Noise can be further decreased by arranging the electric circuit 138 at that end portion 134a of the second FPC 134 which is positioned near the carriage 24, if the sensitivity of the assembly is high enough to allow the arrangement.

Figure 19:
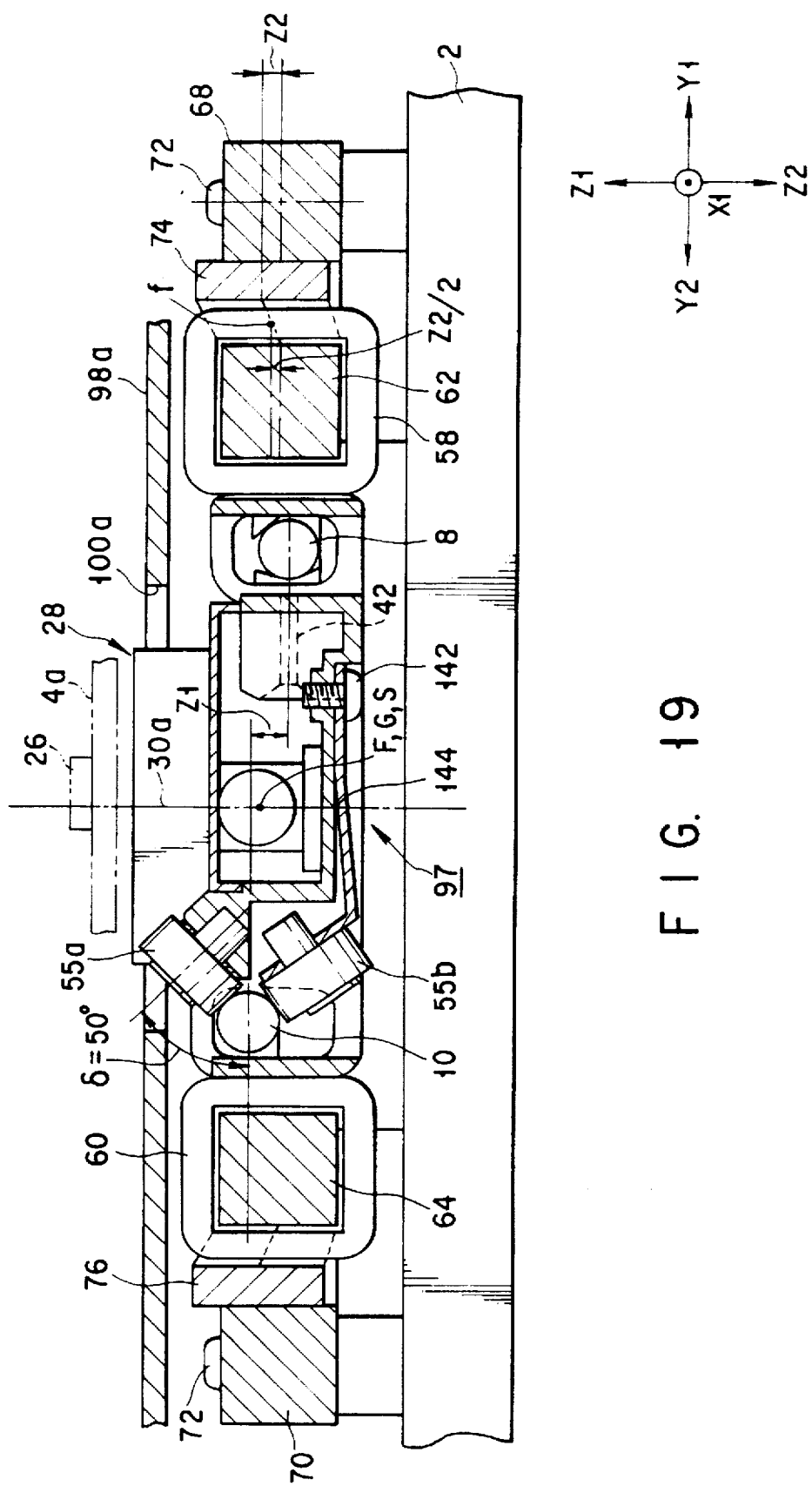
FIG. 19 is a cross-sectional view of the pickup illustrated in FIG. 16.

As seen in FIG. 17, a bearing holder 140 is formed to the upper surface of the $Y_2$-side end portion of the carriage 24. The holder 140 has a hole, in which the shaft of a bearing 55a is fitted. The bearing 55a has an outer race shaped like a hollow cylinder. As shown in FIG. 19, the axis of the bearing 55a extends at an angle δ exceeding 45° (e.g., 50°) to the XY plane. The bearing 55a abuts on a second guide rail 10. Since the axis of the bearing 55a is so inclined, the upper end of the bearing 55a would not contact the disk 4a.

As illustrated in FIG. 17, a pre-loading spring 114 is fastened, at its proximal end, by a screw 142 to the lower surface of the carriage 24. The distal end of the spring 114 has a hole, in which the shaft of a bearing 55b is fitted. The bearing 55b has the same shape as the bearing 55a. As can be seen from FIG. 19, the bearing 55a abuts on the second guide rail 10, applying a pressure onto the rail 10.

Referring back to FIG. 16, the bearings 55a and 55b are displaced in the direction of the arrow $X_1$ with respect to the actuator 28. Therefore, they are located closer to the $Y_1$-side of the pickup than in the case the actuator 28 and these bearings 55a and 55b are arranged side by side along the direction of X-axis.

Thus, the dimension of the assembly 97 can be reduced along the Y axis, thereby to lightening the assembly 97. Further, as shown in FIG. 19, the bearing 55a can be arranged within the window 100 of the cartridge 98a (FIG. 8) containing the disk 4a. This prevents the interference between the bearing 55a and the cartridge 98a. Still further, the midpoint S on the line connecting the axes of the guide rails 8 and 10 is located near the disk 4a, while keeping the rails 8 and 10 displaced from each other along the Z axis. This reduces the dimension of the assembly 79 along the axis Z (i.e., the thickness of the assembly 79).

The actuator 28 further comprises two center yokes 62 and 64, two side yokes 68 and 70, and two magnets 74 and 76. The centers of the magnets 74 and 76 are located above the centers of the access coils 58 and 60, those of the center yokes 62 and 64 and those of the side yokes 68 and 70, and spaced therefrom by a distance Z 2 as shown in FIG. 19. The centers "f" of the magnetic fluxes applied to the coils 58 and 60 in the magnetic gaps between the center yokes 62 and 64 and the magnets 74 and 76 are at a level higher than the centers of the center yokes 62 and 64 by a distance of about $Z_2/2$. Each of the centers "f" of these magnetic fluxes is the center of the driving force which each of the coils 58 and 60 generates and which drives the assembly 97 in the direction of the X axis.

As is illustrated in FIG. 19, the mid point F of both centers "f" exists on the optical axis 30a of the objective lens 30 (FIG. 16) and coincide with the midpoint S of the guide rails 8 and 10, respectively. Also, the midpoint F coincides with the center of gravity G of the assembly 97. In the seventh embodiment, the midpoint F of the driving forces of the access coils 58 and 60 is closer to the disk 4a by $Z_2/2$ than in the case where the coils 58 and 60, the center yokes 62 and 64, and the side yokes 68 and 70 are positioned at substantially the same level. The pickup of the seventh embodiment is, therefore, made relatively thin. This advantage is achieved also in the first embodiments shown in FIGS. 1 to 8.

Since the midpoint F is closer to the disk 4a than the centers of the coils 58 and 60, as viewed along the Z axis, the assembly 97 can be moved as readily as in the first embodiment. For the same reason, the pickup can be made as small as the pickup according to the first embodiment.

In the seventh embodiment, two bearings 42, each having an outer race having a V-groove in its outer circumference, abut on the first guide rail 8 which serves as a reference rail. Generally, when bearings each having a hollow cylindrical outer race and abutting on the reference guide rail are used, four bearings of this type are required. By contrast, the seventh embodiment requires only two bearings of this type, i.e., the bearings 42, and can therefore be manufactured at a lower cost. The bearings 55a and 55b, whose outer races are also hollow cylindrical ones, abut on the second guide rail 10, applying pre-load to the bearing 55b. If only one bearing having a V-grooved outer race were used to be abutted on the second guide rail 10 and to be applied with pre-load or pressures, it might be displaced due to the resonance of the pre-loading spring 114 or the vibration externally applied to the bearing. Consequently, the assembly 98 might be moved in an undesired direction. In the seventh embodiment, the resonance scarcely occurs in the assembly 97 even if the spring 144 resonates, since two bearings 55a and 55b abut on the guide rail 10 and the bearing 55a is fixed in place.

Figure 20:
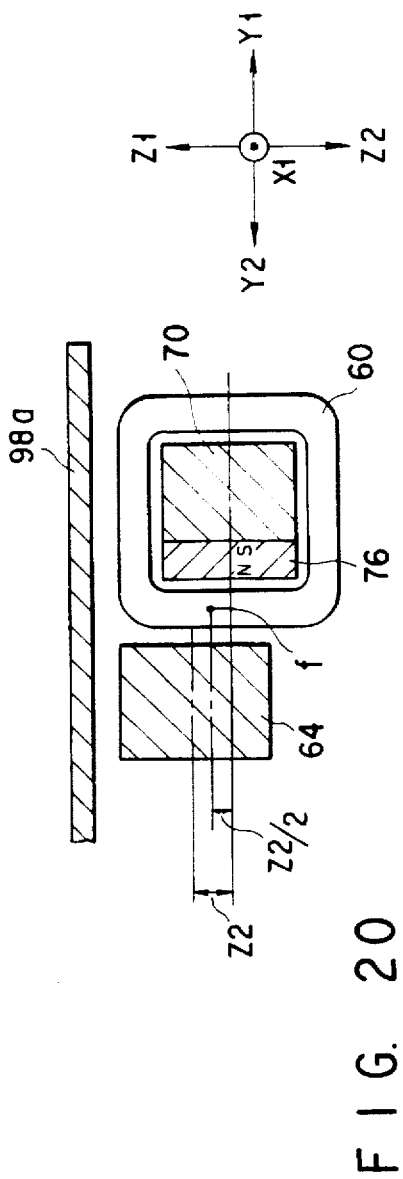
FIG. 20 is a sectional view showing one of the two magnetic circuits incorporated in a pickup according to an eighth embodiment of the present invention.

A pickup according to an eighth embodiment of the invention will now be described, with reference to FIG. 20. As shown in FIG. 10, at the $Y_2$-side of this pickup, a side yoke 70 and a $Y_2$-side magnet 76 are loosely fitted in an access coil 60, and a center yoke 64 is arranged outside the access coil 60. The center of the center yoke 64 is located higher by a distance $Z_2$ than the centers of the access coil 60 and the magnet 76. Hence, the center F of the magnetic field generated by the coil 60 can be placed about $Z_2/2$ higher than otherwise.

Although not shown in the drawings, on the $Y_1$-side of the pickup there are arranged an access coil 58, a center yoke 62, a side yoke 68, and a magnet 74, in the same relationship as their counterparts provided at the $Y_2$-side.

A pickup according to a ninth embodiment of the invention will now be described, with reference to FIG. 21.

Figure 21:
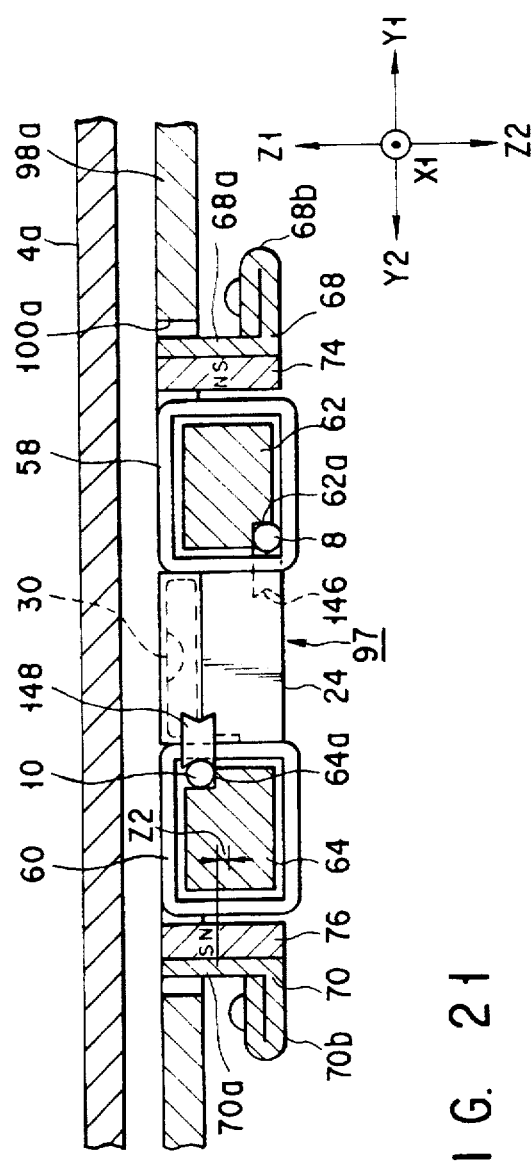
FIG. 21 is a cross-sectional view showing a pickup according to a ninth embodiment of the invention.

As shown in FIG. 21, a $Y_1$-side center yoke 62 has a groove 62a made in the lower-left corner and extending along the X axis. Said corner is located nearer the $Y_2$-side and $Z_2$-side of the pickup than any other corner. A first guide rail 8 is placed in the groove 62a. The first guide rail 8 and the center yoke 62 are loosely fitted in an access coil 58. A $Y_2$-side center yoke 64 has also a groove 64a made in the upper-right corner and extending along the X axis. This corner is located nearer the $Y_1$-side and $Z_1$-side of the pickup than any other corner of the center yoke 64. A second guide rail 10 is placed in the groove 64a. The second guide rail 10 and the center yoke 64 are loosely fitted in an access coil 60. Two bearings 146 and 148 each having a V-groove (hereinafter referred to as "V-grooved bearings") abut on the first guide rail 8 and the second guide rail 10, respectively.

As seen from FIG. 21, the pickup has two side yokes 68 and 70 and two magnets 74 and 76. The side yoke 68 is formed of a vertical portion 68a and a horizontal portion 68b integral with the portion 68a. Similarly, the side yoke 70 is formed of a vertical portion 70a and a horizontal portion 70b integral with the portion 70a. Both vertical portions 68a and 70a extend upwards, and both horizontal portions 68b and 70b are bend double. The magnets 74 and 76 are fastened to the vertical portions 68a and 70a, respectively. The magentas 74 and 76 are positioned such that their midpoints, as viewed along the Z axes, are located higher by $Z_2$ than the midpoints of the coils 58 and 60 and the center yokes 62 and 64.

In the ninth embodiment, the center yoke 62 and the first guide rail 8 are loosely fitted in in the access coil 58, whereas the center yoke 64 and the second guide rail 10 are loosely fitted in in the access coil 60. Furthermore, the horizontal portions 68b and 70b of both side yokes 68 and 70 are thick and and thus have a large cross section. The vertical portions 68a and 70a holding the magnets 74 and 76 are therefore thin. The gap between these portions 68a and 70a is relatively narrow. The vertical portions 68a and 70a and the components located between these portions 68a and 70a can be located within the window 100 of the cartridge 98a (FIG. 8). It follows that the magnets 74 and 76 and the access coils 58 and 60 can be located even closer to the disk 4a. Thus, the counter-balancer (not shown) incorporated in the pickup and positioned below the assembly 97 (not shown in FIG. 21, either) can, therefore, be made small and light or dispensed with. The pickup can therefore be rendered thin and small.

A pickup according to a tenth embodiment of the invention will now be described, with reference to FIGS. 22 and 23.

Figure 22:
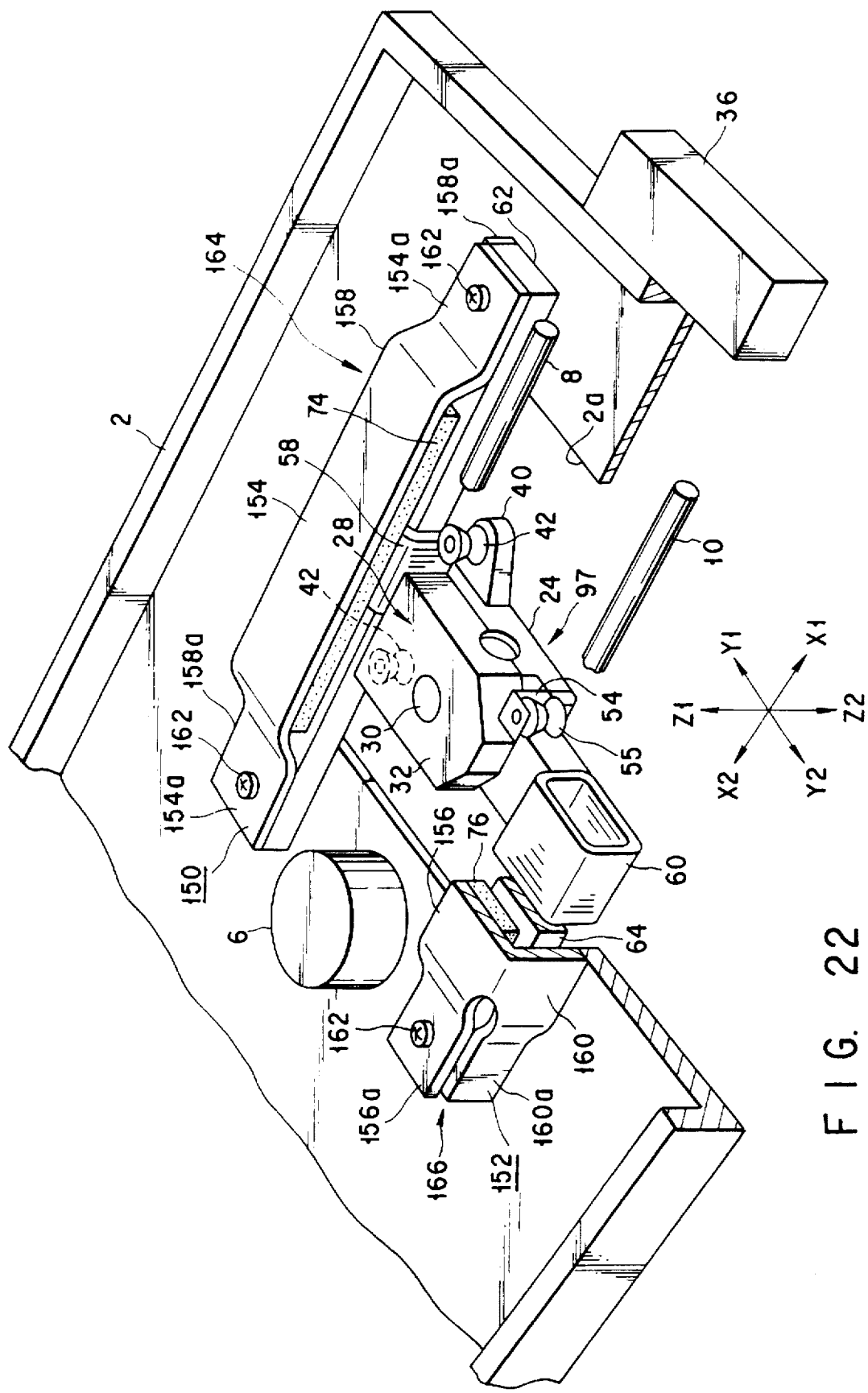
FIG. 22 is a perspective view of a pickup according to a tenth embodiment of this invention.

As is illustrated in FIG. 22, the center yokes 62 and 64 of this embodiment are broad along the Y axis. The side yokes 150 and 152 incorporated in the tenth embodiment have been formed by bending thin iron plates by about 90°. Namely, the first side yoke 150 is comprised of a horizontal portion 154 and a vertical portion 158, and the side yoke 152 is made up of a horizontal portion 156 and a vertical portion 160. Both horizontal portions 154 and 156 extend along the X axis in the XY plane (i.e., a horizontal plane). Both vertical portions 158 and 160 extend along the X axis in the XZ plane (i.e., a vertical plane).

Magnets 74 and 76 are secured to the lower surfaces of the horizontal portions 154 and 156. The width of these portions 154 and 156, namely their length as measured along the Y axis, is greater than the width of the magnets 74 and 76. Two access coils 58 and 60 are so positioned that their upper sides 58a and 60a are located between the center yoke 62 and the vertical portion 158 and between the center yoke 64 and the vertical portion 160. Both ends 154a of the horizontal portion 154 are bent, so that they contact the upper surface of the center yoke 62 and are fastened thereto by screws 162. Similarly, both ends 156a of the horizontal portion 156 are bent, so that they contact the upper surface of the center yoke 64 and are fastened thereto by screws 162. The end portions 158a of the vertical portion 158 are bent, so that they contact upper side of the center yoke 62. Likewise, the end portions 160a of the vertical portion 160 are bent, so that they contact upper side of the center yoke 64.

As shown in FIG. 23, when the disk 4 contained in a cartridge 98 (FIG. 8) is mounted on the shaft of a spindle motor 6 (FIG. 22), the horizontal portions 154 and 156 of the side yokes 150 and 152 and the magnets 74 and 76 are arranged within the window 100 of the cartridge 98, while the respective lower portions of the vertical portions 158 and 160 remain outside the window 100 of the cartridge 98.

The centers of the upper sides 58a and 60a of the access coils 58 and 60, the axes of both guide rails 8 and 10, and the center of gravity of the assembly 97 are located in a plane parallel to the XY plane. In other words, these entities exist at the same level.

The tenth embodiment has two magnetic circuits, which will be described. The magnetic fluxes emanating from the magnets 74 and 76 extend in the direction of the arrow $Z_2$, then pass through magnetic gaps, next enter the center yokes 62 and 64, and finally pass therethrough in the directions of the arrows $X_1$ and $X_2$, respectively. Part of the magnetic fluxes passing through the center yokes 62 and 64 enter the end portions 154a and 156a of the horizontal portions 154 and 156, go through the horizontal portion 154 and 156, and returns to the magnet 74 and 76. The remaining parts of the fluxes having entered the center yokes 62 and 64 enter the end portions 158a and 160a of the vertical portions 158 and 160, pass through the vertical portions 158 and 160 and then through the horizontal portions 154 and 156, and return to the magnets 74 and 76.

Thus, the magnetic flux emanating from the magnet 74 passes through two members (i.e., the horizontal portion 154 and the vertical portion 158), and the magnetic flux emanating from the magnet 76 passes via two members (i.e., the horizontal portion 156 and the vertical portion 160). The horizontal portions 154 and 156 are wider along the Y axis than the magnets 74 and 76 and the center yokes 62 and 64, and are formed integral with the vertical portions 158 and 160, respectively. Hence, as shown in FIG. 23, the side yokes 150 and 152 have a thickness $T_S$ which is about half the thickness $T_C$ of the center yokes 62 and 64. The thickness H of both magnetic circuits 164 and 166 are sufficiently small even if each center yoke, the associated magnet, and the associated side yoke are arranged along the Z axis.

As seen from FIG. 23, the horizontal portions 154 and 156 of the side yokes 150 and 152 and the magnets 74 and 76, which are components of the magnetic circuits 164 and 166, are located within the window 100 of the cartridge 98, both magnetic circuits 164 and 166 can be placed very close to the disk 4. Thus, the pickup can be made thin. Since two bearings 42 are arranged at the $X_1$-side and $X_2$-side of an actuator 28, respectively, and a bearing 55 is provided at the $X_1$-side of the actuator 28, the space between the magnetic circuits 164 and 166 can be narrow along the Y axis, making it easy to position parts of the circuits 164 and 166 within the window 100 of the cartridge 98.

Moreover, since the upper sides 58a and 60a of the access coils 58 and 60 are placed in the magnetic gaps, a drive force is applied to the upper sides 58a and 60a. The point where this force acts exists above the centers of gravity of the coils 58 and 60. The coils 58 and 60 therefore function as a counter-balancer to the actuator 28. No balancer needs to be used in the assembly 97, whereby the assembly 97 can be made light and compact.

In addition, the side yokes 150 and 152 can be formed of a thin iron plate each, they can be made with ease. Also, the vertical portions 158 and 160 of the side yokes 150 and 152 may be lengthened along the Z axis, to thereby decrease the thickness $T_S$ of the side yokes 150 and 152. Further, since both magnetic circuits 164 and 166 are thin, the pickup remains sufficiently thin even if it is re-designed to record data on, or reproduce data from, a disk not contained in a cartridge or any other protective container, or even if the magnetic circuits are arranged below the cartridge.

The pickup according to the tenth embodiment is identical to the first embodiment in features and advantages other than those described above.

A pickup according to an eleventh embodiment of the invention will be described, with reference to FIG. 24.

In this pickup, the $Y_2$-side portion 62a of a center yoke 62 and the $Y_1$-side portion 64a of a center yoke 64 have a semicircular cross section. These portions 62a and 64a abut on two bearings 42 and 55, respectively, and function as guide rails. A side yoke 150 is formed of a vertical portion 158, an upper horizontal portion 154a connected to the lower end of the vertical portion 158 and a lower horizontal portion 154b connected to the lower end of the vertical portion 158. The side yoke 150 therefore has a U-shaped cross section taken along an YZ plane. A side yoke 152 is formed of a vertical portion 160, an upper horizontal portion 156a connected to the lower end of the vertical portion 160 and a lower horizontal portion 156b connected to the lower end of the vertical portion 160. The side yoke 152 is, thus, has a U-shaped cross section taken along an YZ plane.

Two magnets 74 is fastened to the lower and upper surfaces of the upper and lower horizontal portions 154a and 154b, respectively. Another two magnets 76 are fastened to the lower and upper surfaces of the upper and lower horizontal portions 156a and 156b. Not only the horizontal portions 154a, 154b, 156a and 156b, but also the vertical portions 158 and 160 serve as magnetic paths for the magnets 74 and 76. The thickness $T_S$ of the side yokes 150 and 152 can therefore be less than the thickness $T_C$ of the center yokes 62 and 64.

The center yokes 62 and 64 function as guide rails. Four magnets 74 and 76 are arranged above and below the center yokes 62 and 64. In the case that the magnetic circuits 164 and 166 have same driving forces as those in the first embodiment, the Z-axis dimensions of magnetic circuits 164 and 166 are, therefore, larger than in the first embodiment, but the Y-axis dimensions thereof are less than in the first embodiment. As a result of this, parts of the magnetic circuits 164 and 166 can easily be located within the window 100 of a cartridge 98, even if the window 100 has a comparatively small Y-axis dimension.

A pickup according to a twelfth embodiment of the present invention will be described, with reference to FIGS. 25 and 26.

The twelfth embodiment is identical in structure to the tenth and eleventh embodiments, except for the structures of the magnetic circuits 164 and 166. The circuits 164 and 166 are symmetrical with respect to a vertical line and are substantially identical in structure. Hence, the magnetic circuit 166 only will be explained—not only in the following description of the twelfth embodiment, but also in the description of the thirteenth to sixteenth embodiments of the present invention.

The center yoke 64 of the magnetic circuit 166 has cut-outs 64b in the lower surfaces of the both ends 64a. The end portions 168a of a U-shaped connecting yoke 168 are secured to the cut-outs 64b. A magnet 76 is fixed on the middle portion of the connecting yoke 168. The holding portion 152a of a side yoke 152 secured to the upper surface of the magnet 76. The holding portion 152a is connected to a vertical portion 152b, which in turn is connected to a horizontal portion 152c. The center yoke 64 is located below the horizontal portion 152c of the side yoke 152. The gap between the center yoke 64 and the horizontal portion 152c works as a magnetic gap 170. As shown in FIG. 26, the center yoke 64 is loosely fitted in an access coil 60, such that the upper side 60a of the coil 60 is positioned in the magnetic gap 170.

Figure 25:
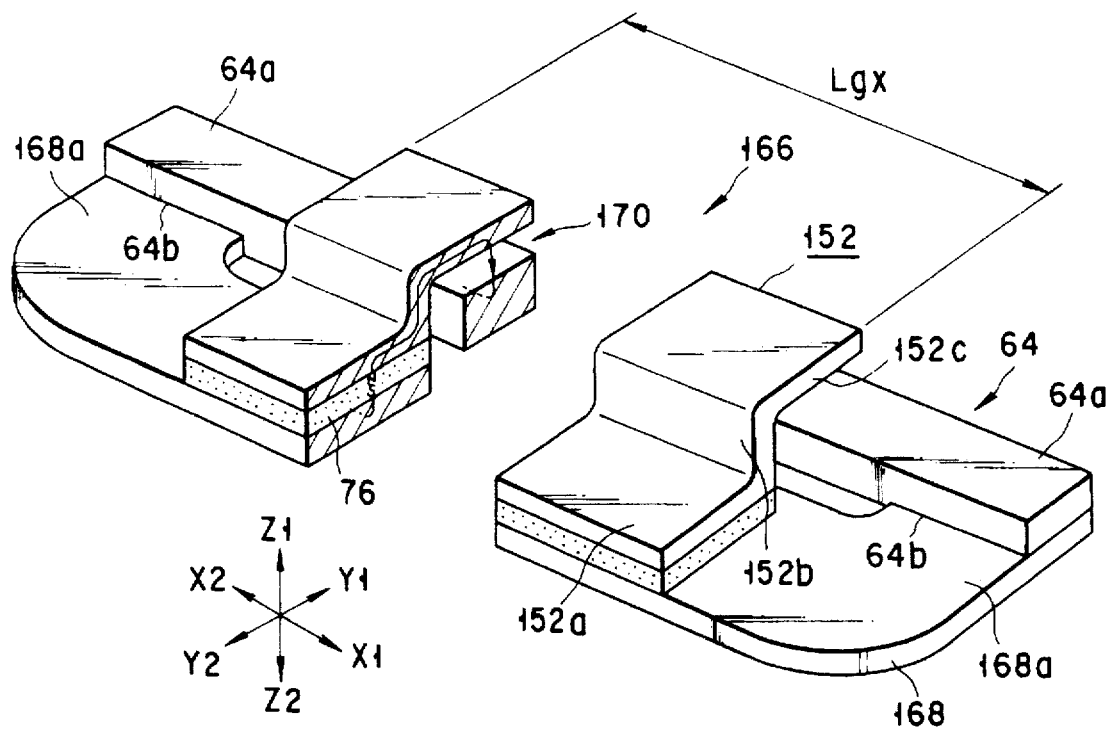
FIG. 25 is a perspective view illustrating the magnetic circuits used in a pickup according to a twelfth embodiment of the present invention.

As can be understood from FIG. 25, the magnetic flux emanating from the magnet 76 passes from the holding portion 152a of the side yoke 152 to the horizontal portion 152c thereof, through the vertical portion 152b thereof. This magnetic flux further passes through the magnetic gap 170 and enters the center yoke 64. Then, the flux passes through the both ends 64a of the center yoke 64 and the end portions 168a of the connecting yoke 168. The magnetic flux further passes through the connecting yoke 168 and finally returns to the magnet 76. The magnetic flux passing through the side yoke 152 intersects with the magnetic flux passing through the center yoke 64.

Figure 26:
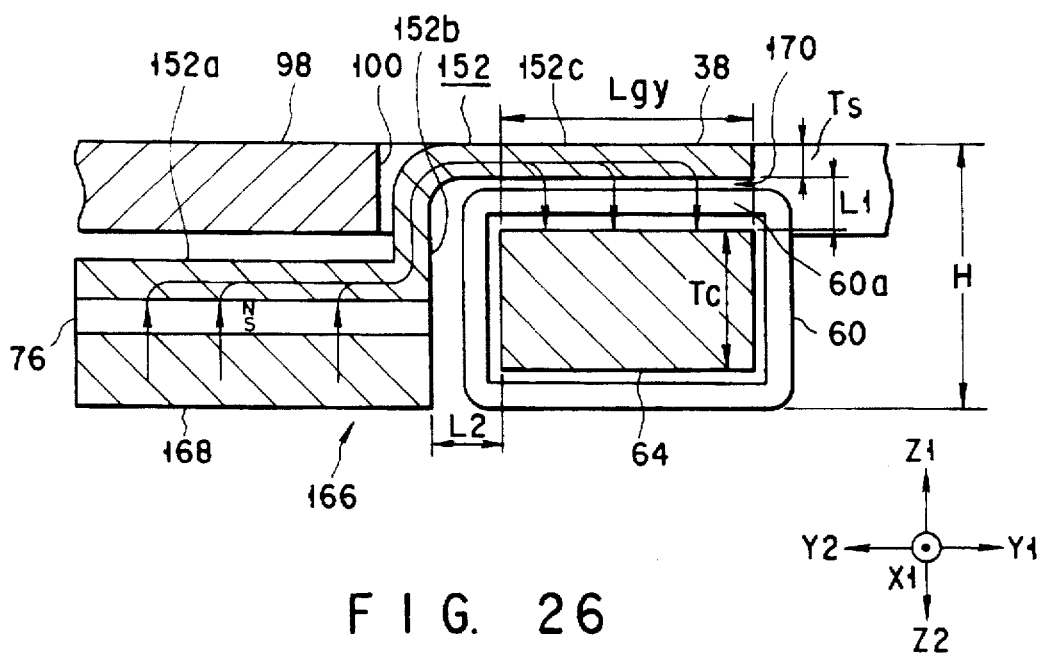
FIG. 26 is a cross-sectional view showing one of the magnetic circuits illustrated in FIG. 25.

In the twelfth embodiment, as shown in FIG. 26, the distance $L_1$ for which the center yoke 64 is spaced along the Z axis from the horizontal portion 152c of the side yoke 152 is shorter than the distance $L_2$ for which the center yoke 64 is spaced along the Y axis from the connecting yoke 168. It is therefore difficult for magnetic fluxes to pass through the space $L_2$. Therefore, there can hardly be generated a force which acts against the force generated at the upper side 60a of the access coil 60. As shown in FIG. 26, the vertical portion 152b and horizontal portion 152c of the side yoke 152 are positioned within the window 100 of a cartridge 98.

In the twelfth embodiment, the center yoke 64 is arranged below the horizontal portion 152c of the side yoke 152, and the magnet 76 is not interposed between the yoke 64 and the horizontal portion 152c. The magnetic circuit 166 therefore has a small thickness H. (So does the other magnetic circuit 164.)

The cross section $A_S$ of the center yoke 64, taken along the YZ plane, will be explained. Since the center yoke 64 is connected at both ends to the ends of the connecting yoke 168, the center yoke 64 needs to have a cross section AC which is:

$$Ac = Bgv \times Lgy \times Lgx \times (½) \times (1/Bs) \qquad (1)$$

where Lgx and Lgy are the width and length of the magnetic gap 170, Bs is the saturated magnetic-flux density in the center yoke 64, and Bgv is the mean magnetic-flux density in the magnetic gap.
Approximately:

$$Ac = T_C \times Lgy \quad (2)$$

From equations (1) and (2), we obtain:

$$T_C = Bgv \times Lgx \times (\tfrac{1}{2}) \times (1/BS) \quad (3)$$

In the optical pickup disclosed in Jpn. Pat. Appln. KOKAI Publication No. 3-1375, the side yoke needs to have a thickness $T_S$ equal to the thickness $T_C$ of the center yoke. In the twelfth embodiment, the side yoke 152 needs to have a cross section As, which is given as:

$$As = Bgv \times Lgy \times Lgx \times (1/Bs) \quad (4)$$

This cross section As is approximately:

$$As = T_S \times Lgx \quad (5)$$

From equations (4) and (5), we have:

$$T_S = Bgv \times Lgy \times (1/Bs) \quad (6)$$

Also, from equations (3) and (6), we obtain:

$$T_S = T_C \times 2 \times Lgy \times (1/Lgx) \quad (7)$$

The access coil 60 which extends along the X axis is moved parallel to the X axis. Thus, Lgx is usually several times greater than Lgy. From equation (7) it is obvious that, if 2Lgy is less than Lgx (namely, 2Lgy<Lgx), then $T_S$ is less than $T_C$ (namely, $T_S<T_C$). To state in another way, $T_S$ can be small if 2Lgy<Lgx.

Assuming that Lgx=30 mm and Lgy=5 mm, then $T_S$ will be only $(\tfrac{1}{3})T_C$. Hence, the thickness of the side yoke 152 can be reduced by applying the magnetic flux within the side yoke 152 at right angles to the flux within the center yoke 64. Furthermore, the thickness of the magnet 76 (i.e., the dimension along the Z axis) can be increased since no coils are arranged around the magnet 76. In addition, the width and/or length of the magnet 76 (the dimension along the X axis and/or the dimension along the Y axis) can be equal to or greater than that of the magnetic gap. This renders it easy to increase the thickness or cross section of the magnet 76, thereby to maximize the flux density in the magnetic gap 170.

A pickup according to a thirteenth embodiment of this invention will be described, with reference to FIGS. 27 and 28.

Figure 27:
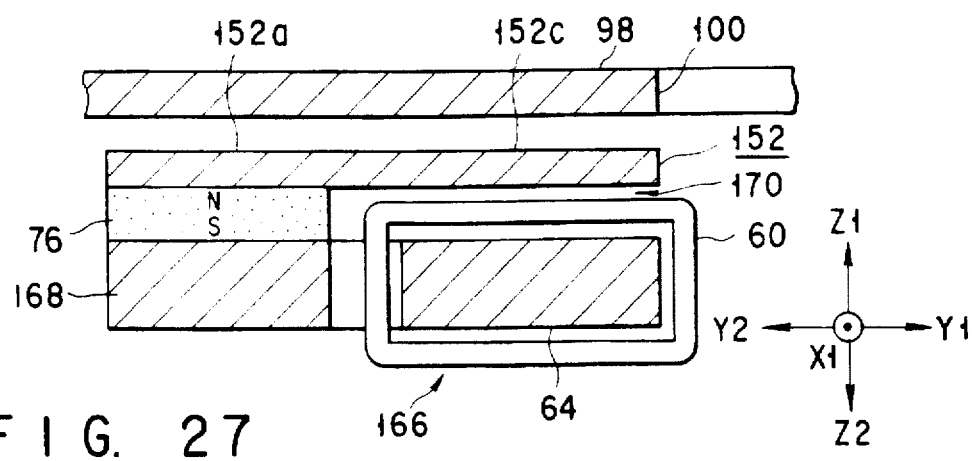
FIG. 27 is a sectional view showing one of the magnetic circuits used in a pickup according to a thirteenth embodiment of this invention.

In the thirteenth embodiment, as shown in FIG. 27, the magnetic circuit 166 (as well as the other magnetic circuit 164) is positioned below the cartridge 98. As seen from FIG. 28, the side yoke 152 is substantially T-shaped, having a holding portion 152a and a horizontal portion 152c which extend in the same horizontal plane. The center yoke 64 has no part which corresponds to the cut-outs 64b shown in FIG. 25, and is connected at its both ends to the ends of the connecting yoke 168 in the XZ plane. The center yoke 64 and the connecting yoke 168 have the same thickness.

The magnet 76 and the holding portion 152a of the side yoke 152 extend longer along the X axes than Lgx. The magnet 76 therefore has a cross section large enough to enhance the magnetic-flux density.

On the $Z_1$-side of the center yoke 64 there is nothing but the horizontal portion 152c of the side yoke 152. The magnet 76 is located on the $Y_2$-side of the center yoke 64. The magnetic circuit 166 shown in FIG. 27 can therefore be made thinner than in the conventional pickups. Hence, although the magnetic circuit 166 is located below the cartridge 98, the pickup is sufficiently small.

A pickup according to a fourteenth embodiment of the present invention will be described, with reference to FIG. 29.

Figure 29:
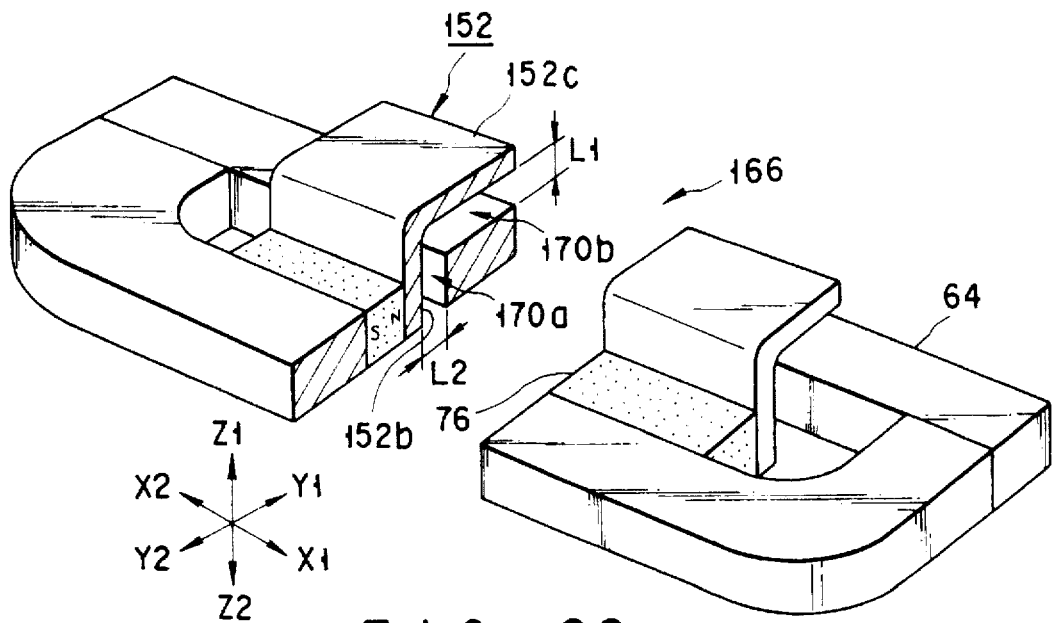
FIG. 29 is a perspective view illustrating the magnetic circuits incorporated in a pickup according to a fourteenth embodiment of the present invention.

As is illustrated in FIG. 29, a magnet 76 is fastened to the $Y_1$-side of a connecting yoke 68. The vertical portion 152b of a side yoke 152 is secured to the $Y_2$-side of the magnet 76. The side yoke 152 has only two portions, i.e., the vertical portion 152b and a horizontal portion 152c. A first magnetic gap 170a is provided between the vertical portion 152b and the $Y_2$-side of a center yoke 64. A second magnetic gap 170b is provided between the horizontal portion 152c and the $Z_1$-side of the center yoke 64.

Thanks to the structural features described in the preceding paragraph, the magnetic circuit 166 of the fourteenth embodiment has a small thickness. Moreover, the dimension of the pickup, as measured along the Z axis, will not increase even if the magnet 76 is made thick in its magnetization direction (i.e., along the Y axis, in this embodiment). It follows that the operating point of the circuit 166 (the point where the magnetism of the magnet 76 acts) can be located high. The magnetism of the magnet 76 would not decrease at, for example, high temperatures.

The magnetic-flux densities in the magnetic gaps 170a and 170b can be adjusted by, for example, changing the ratio between the lengths $L_1$ and $L_2$ of the magnetic gaps 170a and 170b. Furthermore, since the magnetic gaps 170a and 170b are displaced along the Z axis, the center of the driving force generating on the access coil (not shown) can be adjusted along the Z axis. It is therefore unnecessary to use a balancer to optimize the center of gravity of the assembly. This helps to make the assembly both small and light.

Figure 30:
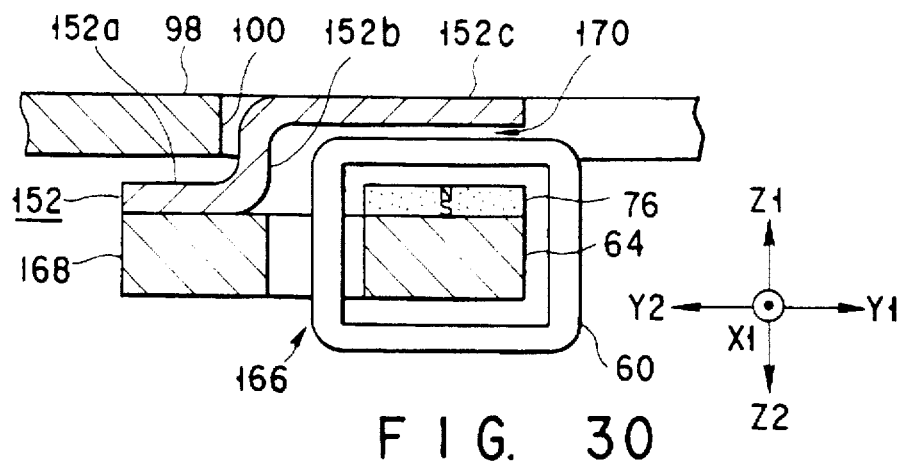
FIG. 30 is a cross-sectional view showing one of the magnetic circuits used in a pickup according to a fifteenth embodiment of the invention.
Figure 31:
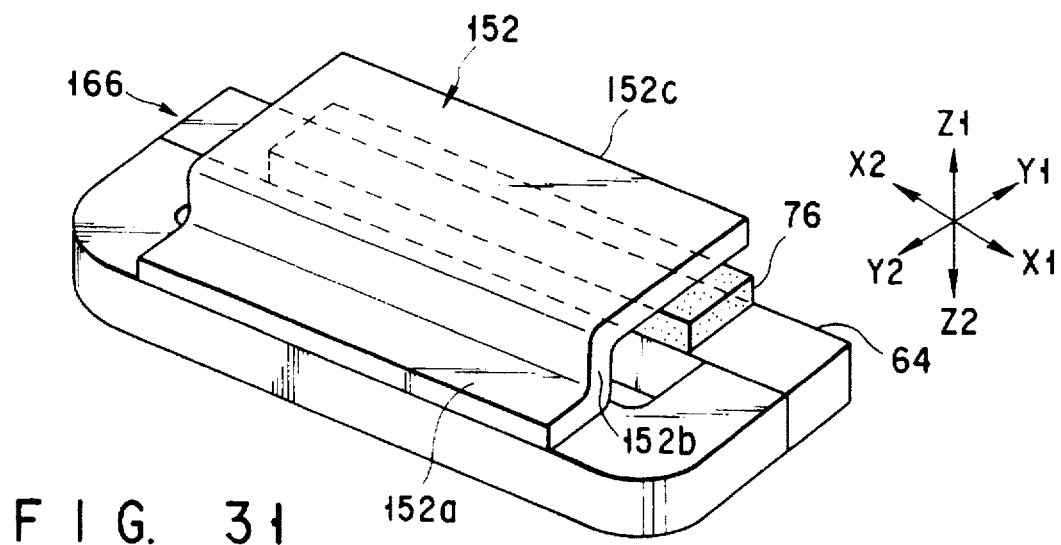
FIG. 31 is a perspective view of the magnetic circuit shown in FIG. 30.

A pickup according to a fifteenth embodiment of the invention will be described, with reference to FIGS. 30 and 31.

In the fifteenth embodiment, a magnet 76 magnetized along the direction of the X axis is fastened to the $Z_1$-side of a center yoke 64, and the holding portion 152a of a side yoke 152 is directly fixed to a connecting yoke 168. As shown in FIG. 30, a magnetic gap 170 is formed between the $Z_1$-side of the magnet 76 and the $Z_2$-side of the horizontal portion 152c of the side yoke 152. Except for these features, the fifteenth embodiment is identical in structure to the tenth embodiment.

In the magnetic circuit 166 of the fifteenth embodiment, a magnetic flux emanates from the magnet 76 in the direction of the arrow $Z_1$, enters the horizontal portion 152c of the side yoke 152, passes through the vertical portion 152b thereof, and enters the holding portion 152a thereof. Then, the magnetic flux extends to the connecting yoke 168, emanates from both ends of the yoke 168, and finally returns to the magnet 74.

Having the structure specified above, the magnetic circuit 166 of the fifteenth embodiment can be adequately thin. Further, since the surface of the magnet 76 is directly exposed to the magnetic gap 170, no noticeable loss of magnetic flux occurs from the magnet 76 to the gap 170. This serves to raise the magnetic-flux density in the magnetic gap 170. Still further, since only one component, i.e., the horizontal portion 152c of the side yoke, is located above the access coil 60, the point where the magnetism acts on the coil 60 can be located closer to the disk.

Figure 32:
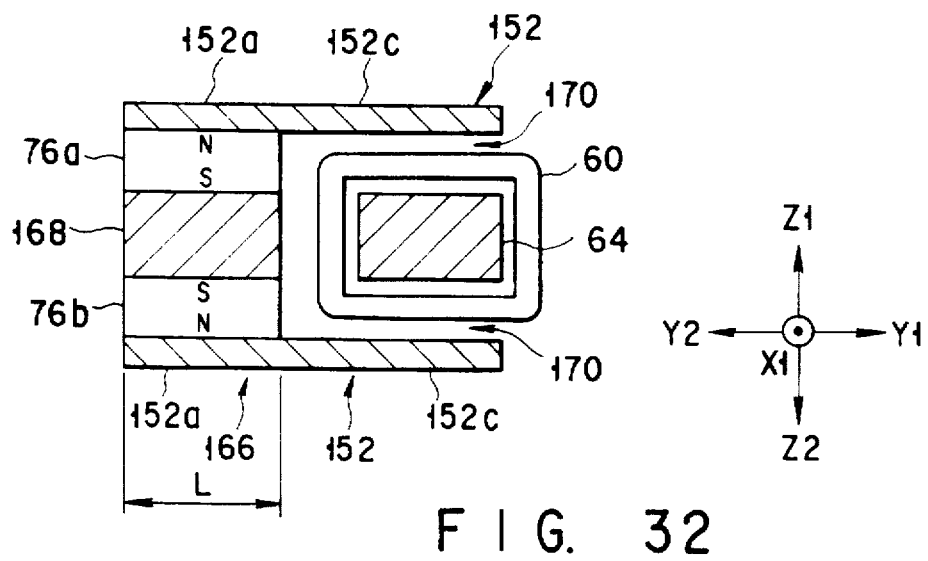
FIG. 32 is a cross-sectional view showing one of the magnetic circuits used in a pickup according to a sixteenth embodiment of the present invention.

A pickup according to a sixteenth embodiment of the present invention will be described, with reference to FIG. 32.

Figure 28:
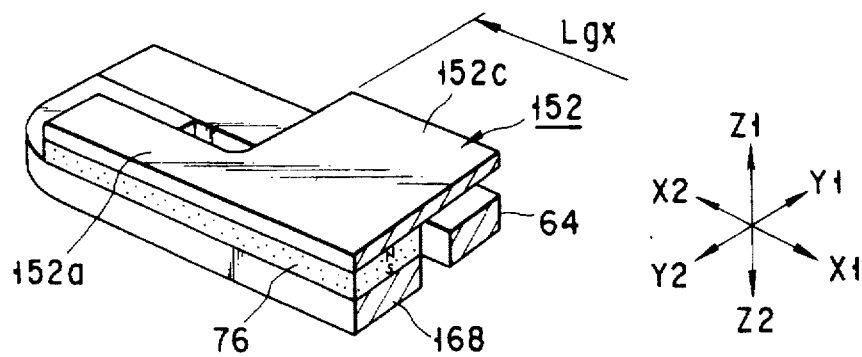
FIG. 28 is a perspective view of the magnetic circuit shown in FIG. 27.

The sixteenth embodiment is a modification of the pickup according to the thirteenth embodiment, which is illustrated in FIGS. 27 and 28. As shown in FIG. 32, a magnet 76b and a side yoke 152b are located below the connecting yoke 168, in addition to a magnet 76a and a side yoke 152a which are provided above the connecting yoke 168. The two magnets 76a and 76b are so positioned that their identical poles oppose each other.

Since the magnets 76a and 76b are arranged above and below the connecting yoke 168, respectively, the magnetic circuit 166 can be shorter along the Y axis than in the thirteenth embodiment, provided that the total flux of magnetic force applied on the access coil 60 is the same as in the thirteenth embodiment.

In any embodiment described above, two group of components, each including a magnet, be arranged—one group above the center yoke 64, and the other group below the center yoke 64.

In the above embodiments, the construction of each optical pickups for optical disks is described. However, the described structure can be applied to a driving apparatus for other medium such as a hard-disk and a floppy-disk.

Although radial bearings and guide rails are used as support means in the embodiments, the combination of balls and V-grooves, slide bearings, and other support means can be used.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical pickup mounted on a base for reproducing data from recording tracks on an optical recording disk contained in a cartridge which has a window that exposes the disk to an outer space, and the disk being rotatable within the cartridge and around a rotational center line which is normal to a surface of the disk, said pickup comprising:

a movable assembly including an objective lens and an actuator for the objective lens, said actuator being arranged to face the objective lens toward the disk via the window of the cartridge;

support means for supporting the movable assembly to enable the movable assembly to move in a first direction corresponding to a radial direction of the disk; and drive means for driving the movable assembly along the first direction;

the actuator of the movable assembly being arranged beside the objective lens in a tangential direction and along a tangent at a point on one of the recording tracks of the disk, the point on the one recording track corresponding to the position of the objective lens;

the support means including a pair of guide rails extending along the first direction and being spaced apart from each other in both the tangential direction and a direction along the rotational center line of the disk, one of the guide rails being arranged beside the objective lens on a side of the objective lens opposite to the actuator in the tangential direction; and another one of the guide rails being arranged beside the actuator in the direction along the rotational center line of the disk to be more separate from the disk than the one guide rail, and p1 at least one part of the movable assembly and the one of the guide rails of the support means being arranged and projecting into the window of the cartridge.

2. The optical pickup according to claim 1, wherein said drive means includes at least a magnetic member and a coil, said magnetic member having a surface constituting a guide surface of said support means.

3. The optical pickup according to claim 1, wherein said drive means includes at least a coil and two magnets fixed to a yoke, said magnets being located above and below said coil.

4. An optical pickup according to claim 1 wherein the movable assembly further includes bearing wheels rolling on the guide rails of the support means in order to guide movement of the movable assembly in the first direction, and a part of the bearing wheel rolling on the one guide rail is arranged in and projecting into the window of the cartridge.

5. An optical pickup according to claim 4 wherein the movable assembly frtther includes a pre-load member for applying pre-load onto the bearing wheel rolling on the one guide rail to press the bearing wheel onto the one guide rail, and a part of the pre-load member is arranged in and to project into the window of the cartridge.

6. An optical pick up of claim 1, wherein the support means is movable in said first direction along a radial direction of the disk and is also movable in a direction perpendicular to the rotational center line of the disk; and the drive means includes;

a pair of yokes arranged beside the movable assembly at both out sides of the movable assembly in a direction perpendicular to the rotational center line of the disk and perpendicular to the first direction;

a pair of magnets arranged beside the pair of yokes at both of said out sides of the yokes in a direction perpendicular to the rotational center line of the disk and perpendicular to the first direction to form magnetic gaps between the pair of magnets and the pair of yokes; and a pair of coils attached to the movable assembly; in center holes of the coils, the pair of yokes being inserted in the coils;

wherein a center of each magnet in the direction along the rotational center line of the disk is shifted in the direction along the rotational center line from a center of at least one of each yoke and an acting portion of each coil in the direction along the rotational center line of the disk, the acting portion of each coil being located in each magnetic gap.

7. An optical pickup of claim 1, wherein the support means is movable in said first direction along a radial direction of the disk and perpendicular to the rotational center line of the disk; and the drive means includes a pair of first yokes arranged beside the movable assembly at both out sides of the movable assembly in a direction perpendicular to the rotational center line of the disk and perpendicular to the first direction;

a pair of magnets arranged beside the pair of first yokes at both of said out sides of the first yokes in a direction perpendicular to the rotational center line of the disk and perpendicular to the first direction, each magnet having magnetic flux passing in a direction along the rotational center line of the disk; and a pair of second yokes attached to surfaces of the pair of magnets, the surfaces of the magnets facing the disk, each second yoke extending from the magnet to a position located at a side of the first yoke, the first yoke neighboring with each of the second yokes, the side facing the disk, and a magnetic gap being formed between an extending end of each of the second yokes and the first yoke neighboring with each of the second yokes, and a pair of coils attached to the movable assembly, the pair of first yokes being inserted into center holes of the coils.

8. An optical pickup of claim 1, wherein said base has first and second surfaces which extend in first and second directions crossing each other at right angles;

said rails are respectively mounted on the first and second surfaces of the base, said guide rails extending in the first direction so as to be parallel to each other, and being separated from each other in the second direction; and said movable assembly includes first and second bearing wheels, each having an inner race secured to the movable assembly and an outer race rotatably supported by the inner race, each outer race having an indented outer peripheral tire surface, the outer race of the first bearing wheel rolling on the first guide member, the outer race of the second bearing rolling on the second guide member, the outer races of the first and second bearing wheels preventing the movable assembly from moving along rotational center lines of the outer races of the first and second bearing wheels, and at least one of the rotational center lines of the outer races of the first and second bearings being inclined to the first and second directions.

9. An optical pickup according to claim 8, wherein the rotational center line of the outer race of the first bearing wheel is perpendicular to the first and second directions, and the rotational center line of the outer race of the second bearing wheel is inclined to the first and second directions.

10. A driving apparatus for driving a movable object, said apparatus comprising:

a base assembly having first and second surfaces which extend in first and second directions crossing each other at right angles;

first and second guide members being respectively mounted on the first and second surfaces of the base assembly, said guide members extending in the first direction so as to be parallel to each other, and being separated from each other in the second direction;

first and second bearing wheels, each of said bearing wheels having an inner race secured to the moveable object and an outer race rotatably supported by the inner race, the rotational center line of the outer race of the first bearing wheel being perpendicular to the first and second directions, each outer race having an indented outer peripheral tire surface, the outer race of the first bearing wheel rolling on the first guide member and the outer race of the second bearing wheel rolling on the second guide member, the rotational center line of the outer race of the second bearing wheel being inclined in the first and second directions, the outer races of the first and second bearing wheels preventing the moveable object from moving along rotational center lines of the outer races of the first and second bearing wheels;

drive means for moving the moveable object along the first and second guide members; and a pre-loading member attached on the movable object and applying a pre-load onto at least one of the first and second bearing wheels in a direction inclined to the first and second surfaces of the base assembly to press the outer race of at least one of the first and second bearing wheels onto at least one of the first and second guide members in a direction inclined to the first and second surfaces of the base assembly.

* * * * *